(12) United States Patent
Shioiri et al.

(10) Patent No.: US 8,562,463 B2
(45) Date of Patent: Oct. 22, 2013

(54) BELT TYPE CONTINUOUSLY VARIABLE TRANSMISSION

(75) Inventors: Hiroyuki Shioiri, Susono (JP); Hiroaki Kimura, Susono (JP); Ryuji Ibaraki, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1336 days.

(21) Appl. No.: 11/912,185

(22) PCT Filed: Apr. 17, 2006

(86) PCT No.: PCT/JP2006/308484
§ 371 (c)(1),
(2), (4) Date: Oct. 22, 2007

(87) PCT Pub. No.: WO2006/115233
PCT Pub. Date: Nov. 2, 2006

(65) Prior Publication Data
US 2009/0062044 A1    Mar. 5, 2009

(30) Foreign Application Priority Data

Apr. 22, 2005    (JP) ................. 2005-125604

(51) Int. Cl.
*F16H 9/12*   (2006.01)
*F16H 59/00*  (2006.01)
*F16H 61/00*  (2006.01)
*F16H 63/00*  (2006.01)

(52) U.S. Cl.
USPC .............................. 474/28; 474/18

(58) Field of Classification Search
USPC ...................... 474/8, 13, 28, 37, 18
See application file for complete search history.

(56) References Cited

U.S. PATENT DOCUMENTS

| 2,346,868 | A | * | 4/1944 | Perry | 474/28 |
| 2,660,069 | A | * | 11/1953 | MacDonald et al. | 474/28 |
| 2,709,373 | A | * | 5/1955 | Barron | 474/28 |
| 2,709,374 | A | * | 5/1955 | Williams | 474/28 |
| 2,731,849 | A | * | 1/1956 | Rockwood et al. | 477/46 |
| 2,779,203 | A | * | 1/1957 | Eubanks | 474/28 |
| 2,789,672 | A | * | 4/1957 | Forkner | 192/3.59 |
| 2,810,296 | A | * | 10/1957 | Long | 474/28 |
| 2,877,528 | A | * | 3/1959 | Long | 474/28 |

(Continued)

FOREIGN PATENT DOCUMENTS

| EP | 0 985 855 | 3/2000 |
| EP | 1 156 235 | 11/2001 |

(Continued)

*Primary Examiner* — William A Rivera
*Assistant Examiner* — Henry Liu
(74) *Attorney, Agent, or Firm* — Oblon, Spivak, McClelland, Maier & Neustadt, L.L.P.

(57) ABSTRACT

A belt type continuously variable transmission that includes a primary pulley; a secondary pulley; a belt where the primary pulley and the secondary pulley are bound; a positioning hydraulic chamber that presses a primary movable sheave to a primary fixed sheave; a supply-side valve that permits working oil to be supplied from the outside to the positioning hydraulic chamber; and a discharge-side control valve that controls permission or prohibition of discharge of the working oil from the positioning hydraulic chamber to the outside. The discharge-side control valve prohibits discharge of the working oil from the positioning hydraulic chamber to the outside when a position of the primary movable sheave is kept constant in the axial direction with respect to the primary fixed sheave.

29 Claims, 9 Drawing Sheets

(56) References Cited

U.S. PATENT DOCUMENTS

| | | | | |
|---|---|---|---|---|
| 2,887,893 A * | 5/1959 | Claas | | 474/28 |
| 2,916,024 A * | 12/1959 | Dodge | | 474/14 |
| 2,916,927 A * | 12/1959 | Opper | | 474/28 |
| 2,927,471 A * | 3/1960 | Long | | 474/26 |
| 3,014,378 A * | 12/1961 | Bruet | | 474/28 |
| 3,118,311 A * | 1/1964 | Francis | | 474/13 |
| 3,137,178 A * | 6/1964 | Bruet | | 474/28 |
| 3,195,368 A * | 7/1965 | Boudewijn | | 477/46 |
| 3,200,666 A * | 8/1965 | Petersen et al. | | 477/46 |
| 3,202,234 A * | 8/1965 | Osborne | | 180/65.7 |
| 3,280,649 A * | 10/1966 | Bruet | | 474/28 |
| 3,395,586 A * | 8/1968 | Kirchner | | 474/11 |
| 3,526,150 A * | 9/1970 | Iverson | | 474/28 |
| 3,557,640 A * | 1/1971 | Hendricks et al. | | 477/48 |
| 3,596,528 A * | 8/1971 | Dittrich et al. | | 474/12 |
| 3,600,960 A * | 8/1971 | Karig et al. | | 474/12 |
| 3,685,365 A * | 8/1972 | Bauer | | 474/28 |
| 3,704,634 A * | 12/1972 | Schrodt | | 474/18 |
| 3,801,214 A * | 4/1974 | Jonsson | | 415/72 |
| 4,350,491 A * | 9/1982 | Steuer | | 474/12 |
| 4,500,301 A * | 2/1985 | Cadee | | 474/28 |
| 4,547,178 A * | 10/1985 | Hayakawa et al. | | 474/11 |
| 4,608,031 A * | 8/1986 | Vahabzadeh | | 474/17 |
| 4,673,379 A * | 6/1987 | Ohzono et al. | | 474/28 |
| 4,753,627 A * | 6/1988 | Kawamoto | | 474/18 |
| 5,108,348 A * | 4/1992 | Bornmann | | 474/18 |
| 5,269,726 A * | 12/1993 | Swanson et al. | | 474/28 |
| 5,711,730 A * | 1/1998 | Friedman et al. | | 474/18 |
| 5,879,253 A * | 3/1999 | Friedmann et al. | | 474/18 |
| 6,361,470 B1 * | 3/2002 | Friedmann et al. | | 477/37 |
| 6,843,740 B2 * | 1/2005 | Muller et al. | | 474/28 |

FOREIGN PATENT DOCUMENTS

| | | |
|---|---|---|
| JP | 60-95259 | 5/1985 |
| JP | 61 70263 | 4/1986 |
| JP | 63-38748 | 2/1988 |
| JP | 1-283455 | 11/1989 |
| JP | 3-193532 | 8/1991 |
| JP | 6-4451 | 1/1994 |
| JP | 9 291993 | 11/1997 |
| JP | 2001 323978 | 11/2001 |
| JP | 2001 330112 | 11/2001 |

\* cited by examiner

BELT TYPE CONTINUOUSLY VARIABLE TRANSMISSION

TECHNICAL FIELD

The present invention relates to a belt type continuously variable transmission.

BACKGROUND ART

Generally, in a vehicle, a transmission is provided on an output side of a driving source in order to transmit driving force from an internal combustion engine or an electric motor which is of a driving source, i.e., in order to transmit an output torque to a road surface on the optimum condition according to a vehicle running state. The transmission contains a continuously variable transmission which controls a transmission gear ratio in a non-stage (continuous) manner and a gear drive transmission which controls the transmission gear ratio in a stage (discontinuous) manner. The continuously variable transmission contains a belt type continuously variable transmission including two pulleys, i.e., a primary pulley and a secondary pulley and a belt. The driving force is transmitted from the driving source to the primary pulley. The secondary pulley changes and outputs an output torque transmitted to the primary pulley. The belt transmits the driving force transmitted to the primary pulley to the secondary pulley. The primary pulley and the secondary pulley include two pulley shafts (a primary pulley shaft and a secondary pulley shaft), two movable sheaves (a primary movable sheave and a secondary movable sheave), two fixed sheaves (a primary fixed sheave and a secondary fixed sheave), and a belt sandwiching pressure generating unit. The two pulley shafts are arranged in parallel. The two movable sheaves slide on the pulley shafts in axial directions thereof respectively. The two fixed sheaves face the two movable sheaves in the axial directions thereof respectively, and the fixed sheaves form V-shaped grooves between the fixed sheaves and the movable sheaves respectively. The belt sandwiching pressure generating unit generates belt sandwiching pressure between the movable sheave and the fixed sheave. The belt is entrained in the V-shaped grooves formed in the primary pulley and the secondary pulley.

In the belt type continuously variable transmission, the two movable sheaves slide on the pulley shafts in the axial directions thereof by the belt sandwiching pressure generating unit respectively, which changes widths of the V-shaped grooves formed in the primary pulley and the secondary pulley respectively. Therefore, contact radiuses between the belt and the primary pulley and secondary pulley are changed in a non-stage manner to change the transmission gear ratio in the non-stage manner. That is, the output torque from the driving source is changed in a non-stage manner.

For example, as shown in Japanese Patent Application Laid-Open (JP-A) No. 2001-323978, the belt sandwiching pressure generating means contains one in which the movable sheave is pressed toward the fixed sheave side to generate the belt sandwiching pressure by an oil pressure of a hydraulic chamber. In the belt type continuously variable transmission, sometimes a position in the axial direction of the movable sheave is kept constant with respect to the fixed sheave to fix the transmission gear ratio. In this case, in the conventional belt type continuously variable transmission shown in JP-A No. 2001-323978, it is necessary that the oil pressure of the hydraulic chamber be held at a constant oil pressure in order to keep the belt sandwiching pressure constant.

DISCLOSURE OF INVENTION

Accordingly, in the conventional belt type continuously variable transmission, it is necessary to drive an oil pump included in a working oil supply control device not only in changing the transmission gear ratio but also in fixing the transmission gear ratio. The working oil supply control device supplies working oil to the hydraulic chamber. Therefore, there is a fear that driving loss is increased in the oil pump. In the case where the oil pump is driven by the driving force of the internal combustion engine, there is a fear that transmission efficiency is decreased in the driving force of the internal combustion engine.

The present invention has been achieved in order to solve the above problems. It is an object of this invention to provide a belt type continuously variable transmission which can suppress the increase in power loss of the oil pump.

To solve the problems and to achieve the object, a belt type continuously variable transmission according to one aspect of the present invention includes two pulleys which have two pulley shafts, two movable sheaves, and two fixed sheaves, the two pulleys being arranged in parallel, driving force being transmitted from a driving source to either of the two pulley shafts, the two movable sheaves sliding on the two pulley shaft in an axial direction respectively, the two fixed sheaves facing the two movable sheaves in the axial direction respectively; a belt which transmits the driving force, transmitted from the driving source to one pulley of the two pulleys, to the other pulley; a positioning hydraulic chamber which presses the movable sheave onto the fixed sheave side; and a communication unit which is configured to permit working oil to be supplied from an outside of the positioning hydraulic chamber to the positioning hydraulic chamber and to control permission or prohibition of discharge of the working oil from the positioning hydraulic chamber to the outside.

In the belt type continuously variable transmission, the communication unit may include a supply-side valve which permits the working oil only to be supplied from the outside to the positioning hydraulic chamber; and a discharge-side control valve which controls the permission or the prohibition of the discharge of the working oil from the positioning hydraulic chamber to the outside.

In the belt type continuously variable transmission, the discharge-side control valve may prohibit the discharge of the working oil from the positioning hydraulic chamber to the outside when a position of the movable sheave is kept constant in the axial direction with respect to the fixed sheave.

In the belt type continuously variable transmission, the positioning hydraulic chamber may press the movable sheave to the fixed sheave in the pulley having the pulley shaft to which the driving force is transmitted from the driving source.

According to the belt type continuously variable transmission, the discharge of the working oil to the outside from the positioning hydraulic chamber can be prohibited when the position in the axial direction of the movable sheave is kept constant with respect to the fixed sheave, i.e., when the transmission gear ratio is fixed. That is, in fixing the transmission gear ratio, the working oil can be held in the positioning hydraulic chamber. Accordingly, even if the position in the axial direction of the movable sheave tries to change with respect to the fixed sheave, the position in the axial direction of the movable sheave is kept constant with respect to the fixed sheave by changing the oil pressure of the positioning hydraulic chamber. Therefore, the position in the axial direction of the movable sheave is kept constant with respect to the fixed sheave, and it is not necessary that the working oil is supplied from the outside to the positioning hydraulic chamber, so that the increase in power loss of the oil pump can be suppressed.

The belt type continuously variable transmission may further includes a centrifugal hydraulic chamber which faces the positioning hydraulic chamber in the axial direction. In the belt type continuously variable transmission, the working oil discharged from the positioning hydraulic chamber to the outside may be supplied to the centrifugal hydraulic chamber, when the discharge-side control valve permits the discharge of the working oil from the positioning hydraulic chamber to the outside.

According to the belt type continuously variable transmission, the working oil discharged from the positioning hydraulic chamber is supplied to the centrifugal hydraulic chamber. Accordingly, it is not necessary to form the new passage which supplies the working oil to the centrifugal hydraulic chamber, so that the miniaturization can be achieved. Because it is not necessary that the working oil be newly supplied to the centrifugal hydraulic chamber, the increase in driving loss of the oil pump can further be suppressed.

In the belt type continuously variable transmission, the supply-side valve may be a check valve which is opened toward a direction in which the working oil is supplied from the outside to the positioning hydraulic chamber, the supply-side valve may be located in a radial inside of the movable sheave with respect to the discharge-side control valve, and the supply-side valve may be arranged so as to be opened toward a radial outside of the movable sheave.

According to the belt type continuously variable transmission, because the supply-side valve is located in the radial inside of the movable sheave with respect to the discharge-side control valve, the force acting on the supply-side valve can be decreased in operating the belt type continuously variable transmission, when compared with the case where the supply-side valve is located in the radial outside of the movable sheave. At this point, because the supply-side valve is arranged so as to be opened toward the radial outside of the movable sheave, the supply-side valve is easily opened by the force generated in operating the belt type continuously variable transmission. However, the increase in pressing force for opening the supply-side valve can be suppressed.

In the belt type continuously variable transmission, the supply-side valve may be a check valve which is opened toward the direction in which the working oil is supplied from the outside to the positioning hydraulic chamber, and the supply-side valve may be arranged so as to be opened toward the radial inside of the movable sheave.

According to the invention, because the supply-side valve is opened toward the radial inside of the movable sheave, it is difficult to open the supply-side valve by the force generated in operating the belt type continuously variable transmission. Accordingly, the pressing force for closing the supply-side valve can be decreased.

In the belt type continuously variable transmission, the communication unit may be provided in at least one of the movable sheave and the fixed sheave.

In the belt type continuously variable transmission, the positioning hydraulic chamber may be a space unit which is formed by the movable sheave and a partition fixed to the fixed sheave, and the communication unit may be provided at least one of the movable sheave and the partition constituting the space unit which is of the positioning hydraulic chamber.

In the belt type continuously variable transmission, the supply-side valve may be arranged in the movable sheave, and the discharge-side control valve may be arranged in the partition.

According to the belt type continuously variable transmission, because the communication unit is provided in the pulley or the region which constitutes the positioning hydraulic chamber, it is not necessary that a member is separately arranged in order to provide the communication unit. That is, the communication unit, the movable sheave, and the fixed sheave (partition) can commonly be used.

In the belt type continuously variable transmission, the supply-side valve may be arranged on the opposite side to the fixed sheave beyond the space unit in the movable sheave.

According to the belt type continuously variable transmission, the supply-side valve is not formed at a point where stress of the movable sheave is concentrated, i.e., near the corner portion of an inner diameter of the movable sheave. Accordingly, the decrease in rigidity of the movable sheave can be suppressed, and durability, the transmission efficiency, and the like can be improved.

The belt type continuously variable transmission according to the present invention has an effect that the increase in power loss of the oil pump can be suppressed because the discharge of the working oil can be prohibited to the outside from the positioning hydraulic chamber, when the movable sheave is kept constant at the position in the axial direction with respect to the fixed sheave.

BEST MODE(S) FOR CARRYING OUT THE INVENTION

The invention will be described in detail with reference to the drawings. However, the invention is not limited to the following embodiments. Components in the following embodiments include a component which those skilled in the art could easily imagine or a component which is substantially similar to that of the embodiments. An internal combustion engine (such as a gasoline engine, a Diesel engine, and an LPG engine) is used as a driving source which generates the driving force transmitted to the belt type continuously variable transmission in the following embodiments. However, the invention is not limited to the internal combustion engine, but an electric motor such as a motor may be used as the driving source. In the following embodiments, a hydraulic chamber which presses a primary movable sheave of a primary pulley against a fixed sheave side is used as a positioning hydraulic chamber. However, a hydraulic chamber which presses a secondary movable sheave of a secondary pulley against a secondary fixed sheave side may be used as the positioning hydraulic chamber.

Figure 1:
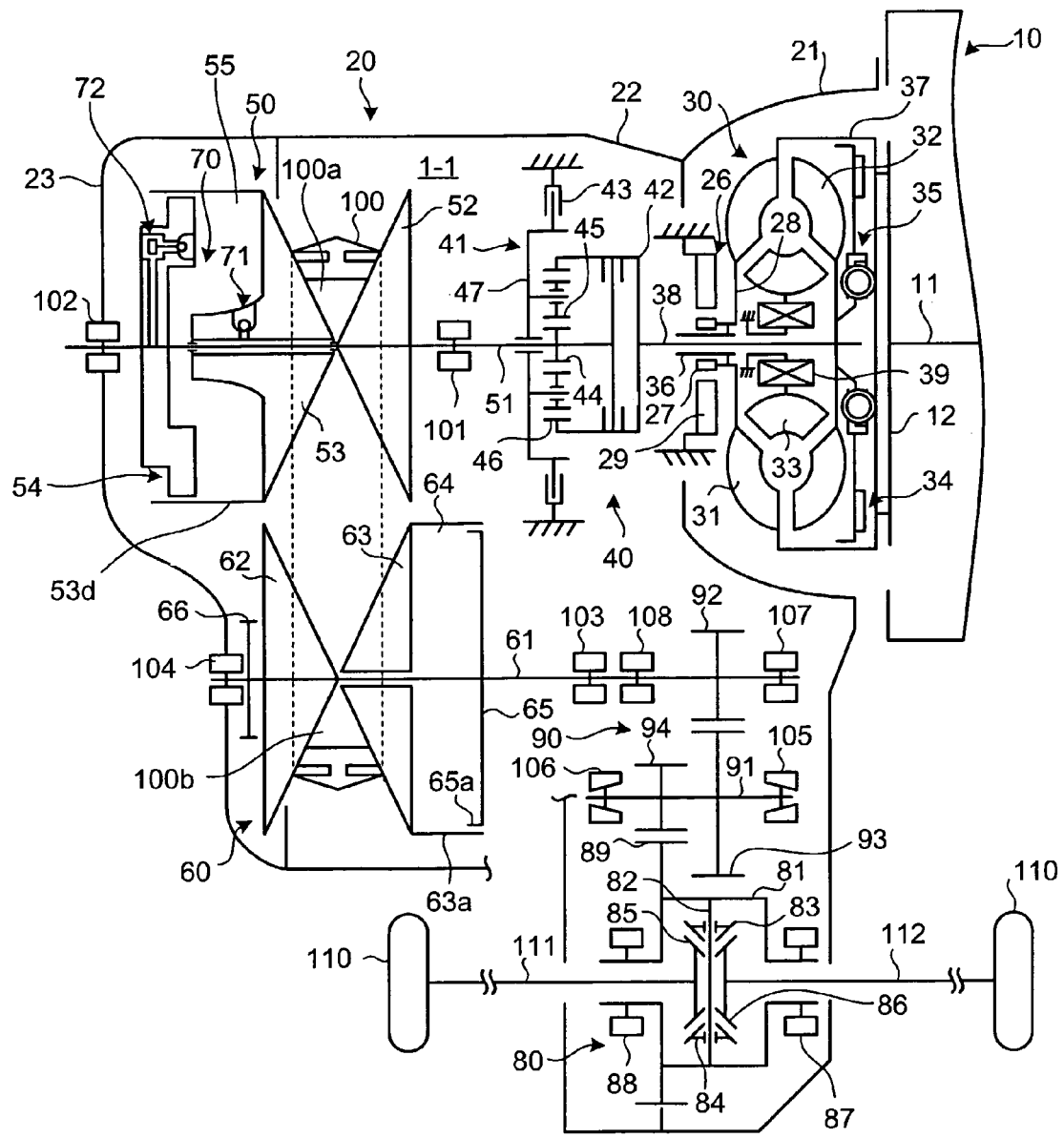
FIG. 1 is a skeleton drawing showing a belt type continuously variable transmission according to a first embodiment.
Figure 2:
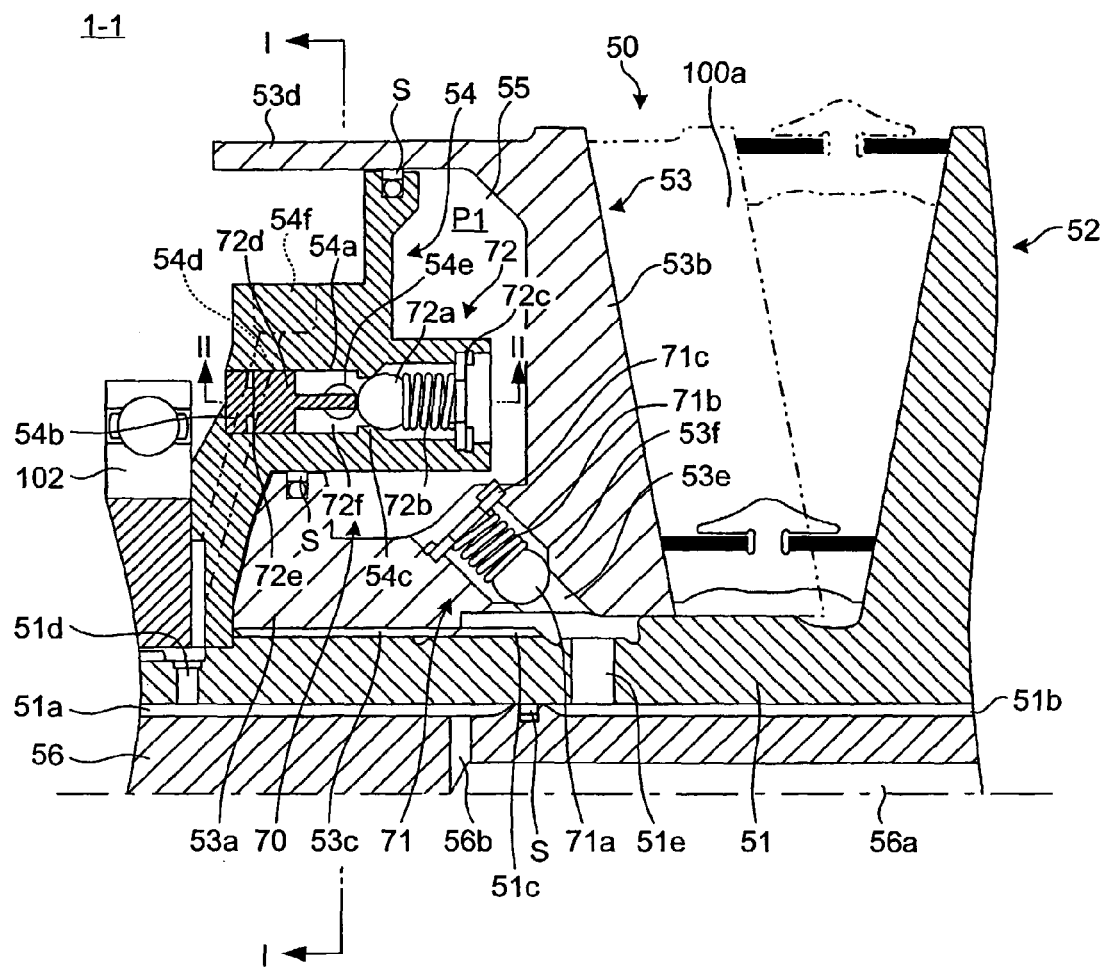
FIG. 2 is a sectional view showing a main part of a primary pulley.
Figure 3A:
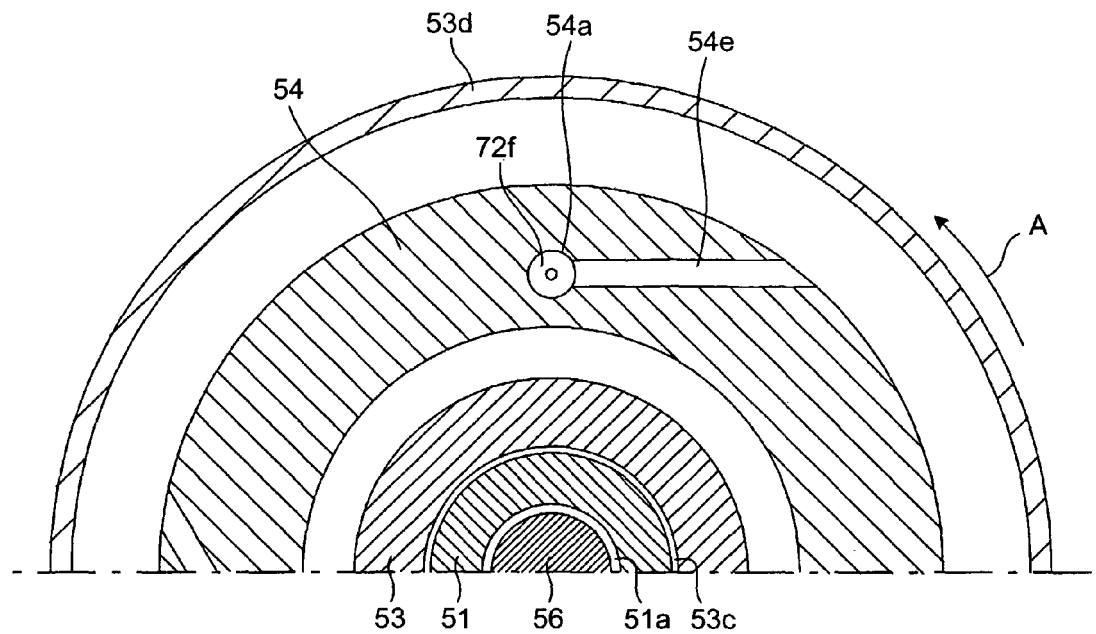
FIG. 3A is a sectional view taken along line I-I of FIG. 2.
Figure 3B:
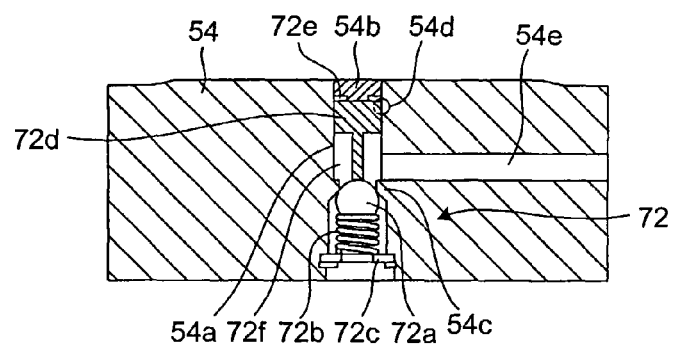
FIG. 3B is a sectional view taken along line II-II of FIG. 2.
Figure 4:
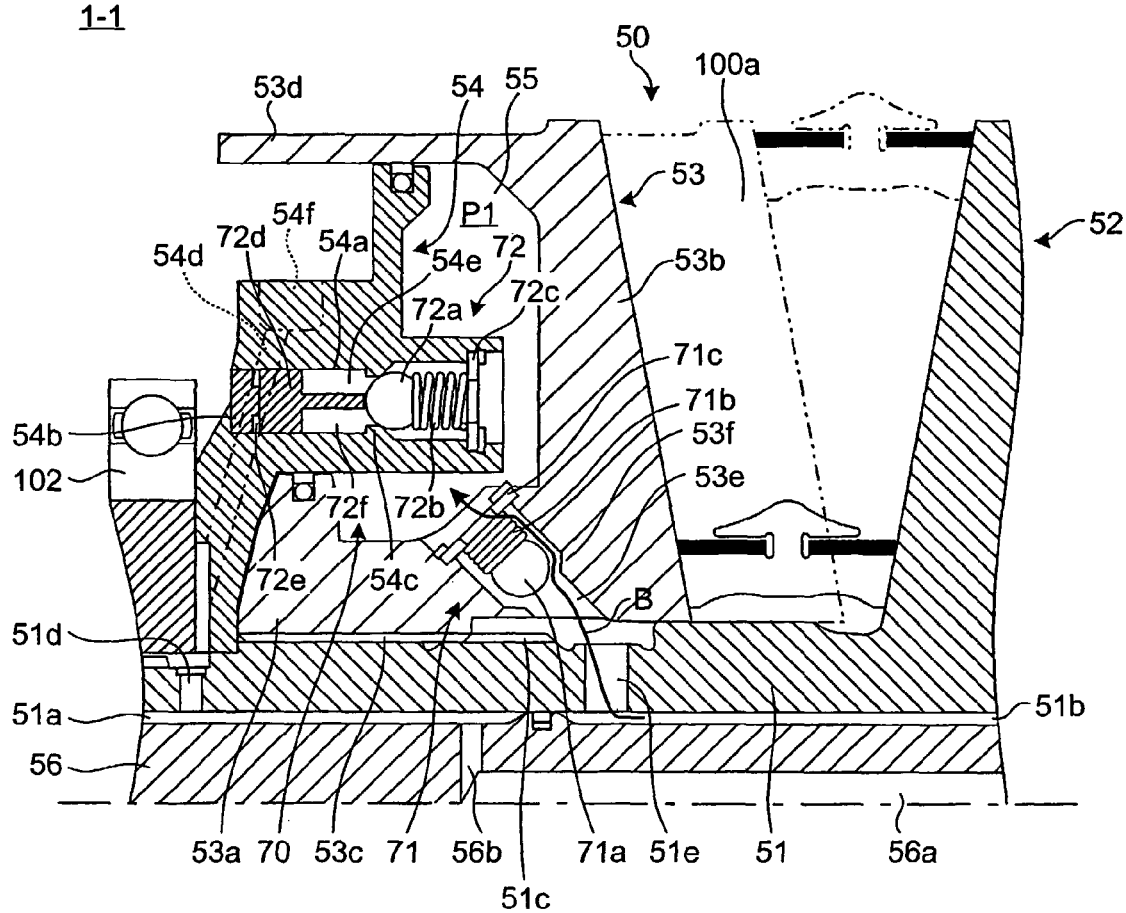
FIG. 4 is an explanatory view showing an operation of the belt type continuously variable transmission in changing a transmission gear ratio.
Figure 5:
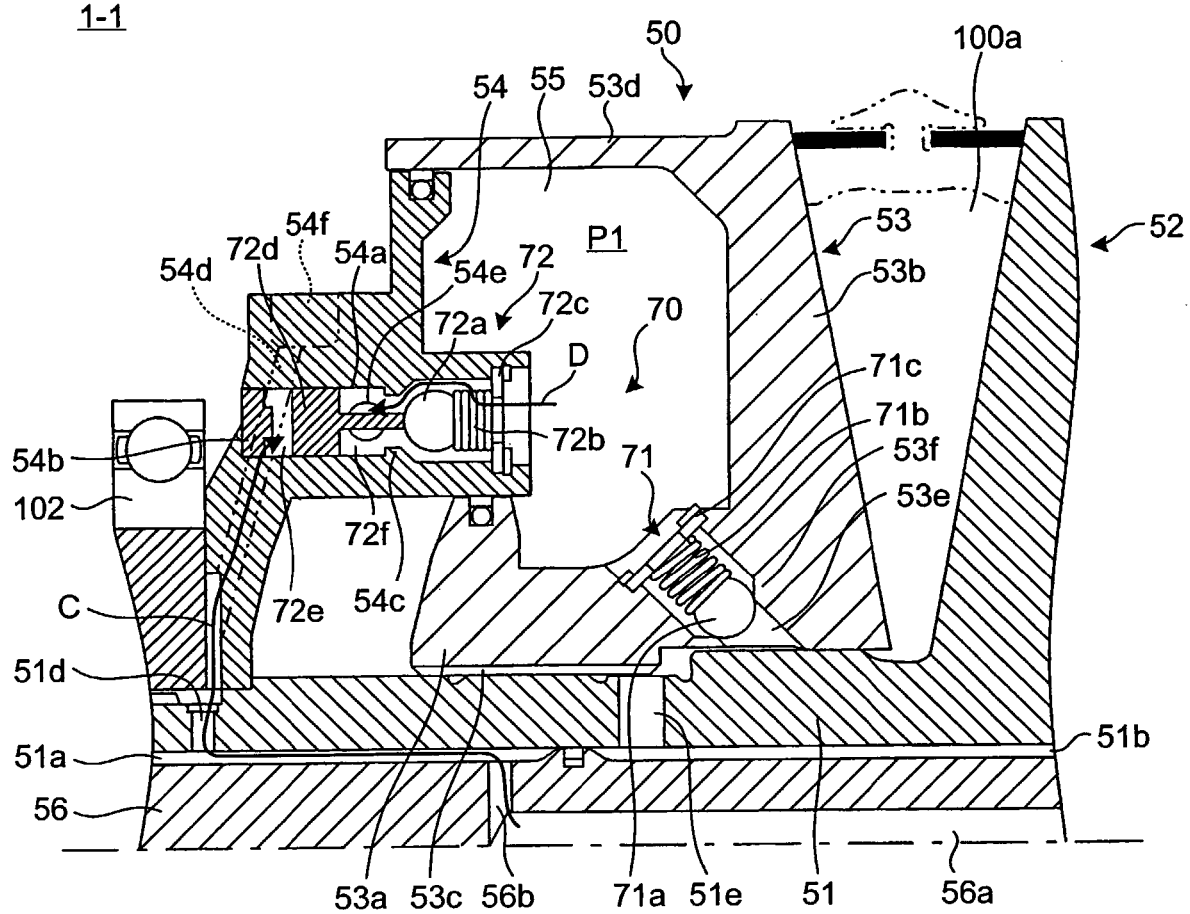
FIG. 5 is an explanatory view showing an operation of the belt type continuously variable transmission in changing a transmission gear ratio.

FIG. 1 is a skeleton drawing showing a belt type continuously variable transmission according to a first embodiment. FIG. 2 is a sectional view showing a main part of a primary pulley. FIG. 3A is a sectional view taken along line I-I of FIG. 2. FIG. 3B is a sectional view taken along line II-II of FIG. 2. FIG. 4 is an explanatory view showing an operation of the belt type continuously variable transmission in changing a transmission gear ratio. FIG. 5 is an explanatory view showing an operation of the belt type continuously variable transmission in changing a transmission gear ratio. As shown in FIG. 1, a transaxle 20 is arranged on the output side of an internal combustion engine 10. The transaxle 20 includes a transaxle housing 21, a transaxle case 22 attached to the transaxle housing 21, and a transaxle rear cover 23 attached to the transaxle case 22.

A torque converter 30 is accommodated in the transaxle housing 21. On the other hand, a primary pulley 50 and a secondary pulley 60, a primary hydraulic chamber 55, a secondary hydraulic chamber 64, a communication unit 70, and a belt 100 are accommodated in a case formed by the transaxle case 22 and the transaxle rear cover 23. The primary pulley 50 and the secondary pulley 60 are of two pulleys constituting a belt type continuously variable transmission 1-1 according to the first embodiment. The primary hydraulic chamber 55 is of the positioning hydraulic chamber. The reference numeral 40 denotes a forward-and-reverse-movement changing mechanism, the reference numeral 80 denotes a final reduction gear which transmits the driving force of an internal combustion engine 10 to a wheel 110, and the reference numeral 90 denotes a power transmission path.

As shown in FIG. 1, the torque converter 30 which is of a starting mechanism directly transmits the driving force from the driving source, i.e., an output torque from the internal combustion engine 10 to the belt type continuously variable transmission 1-1, or the torque converter 30 transmits the output torque to the belt type continuously variable transmission 1-1 while increasing the output torque. The torque converter 30 includes at least a pump (pump impeller) 31, a turbine (turbine impeller) 32, a stator 33, a lock-up clutch 34, and a damper device 35.

The pump 31 is attached to the rotatable hollow shaft 36 while centered on the same axial line as a crank shaft 11 of the internal combustion engine 10. That is, the pump 31 can be rotated along with a hollow shaft 36 about the same axial line as the crank shaft 11. The pump 31 is connected to a front cover 37. The front cover 37 is coupled to the crank shaft 11 through a drive plate 12 of the internal combustion engine 10.

The turbine 32 is arranged while facing the pump 31. The turbine 32 is arranged inside the hollow shaft 36, and the turbine 32 is attached to a rotatable input shaft 38 while centered on the same axial line as the crank shaft 11. That is, the turbine 32 can be rotated along with the input shaft 38 about the same axial line as the crank shaft 11.

The stator 33 is arranged between the pump 31 and the turbine 32 through the one way clutch 39. The one way clutch 39 is fixed to the transaxle housing 21. The lock-up clutch 34 is arranged between the turbine 32 and the front cover 37, and the lock-up clutch 34 is coupled to the input shaft 38 through the damper device 35. The working oil which is of a working fluid is supplied from a working oil supply control device (not shown) to a casing formed by the pump 31 and the front cover 37.

An operation of the torque converter 30 will be described. The output torque from the internal combustion engine 10 is transmitted from the crank shaft 11 to the front cover 37 through the drive plate 12. In the case where the lock-up clutch 34 is released by the damper device 35, the output torque transmitted from the internal combustion engine 10 to the front cover 37 is transmitted to the pump 31, and the output torque is transmitted to the turbine 32 through the working oil circulating between the pump 31 and the turbine 32. The output torque transmitted from the internal combustion engine 10 to the turbine 32 is transmitted to the input shaft 38. That is, the torque converter 30 transmits the output torque from the internal combustion engine 10 to the later-mentioned belt type continuously variable transmission 1-1 through the input shaft 38 while increasing the output torque. In the above configuration, the stator 33 changes a flow of the working oil circulating between the pump 31 and the turbine 32, which allows predetermined torque characteristics to be obtained.

On the other hand, in the case where the lock-up clutch 34 is locked by the damper device 35 (in the case where the lock-up clutch 34 engages the front cover 37), the output torque transmitted from the internal combustion engine 10 to the front cover 37 is directly transmitted to the input shaft 38 without involving the working oil. That is, the torque converter 30 directly transmits the output torque from the internal combustion engine 10 to the later-mentioned belt type continuously variable transmission 1-1 through the input shaft 38.

An oil pump 26 is provided between the torque converter 30 and the forward-and-reverse-movement changing mechanism 40. The oil pump 26 includes a rotor 27, a hub 28, and a body 29. The oil pump 26 is connected to the pump 31 through the cylindrical hub 28 by the rotor 27. The body 29 is fixed to the transaxle case 22. The hub 28 is splined to the hollow shaft 36. Accordingly, the oil pump 26 can be driven because the output torque from the internal combustion engine 10 is transmitted to the rotor 27 through the pump 31.

As shown in FIG. 1, the forward-and-reverse-movement changing mechanism 40 transmits the output torque, transmitted from the internal combustion engine 10 through the torque converter 30, to the primary pulley 50 of the later-mentioned belt type continuously variable transmission 1-1. The forward-and-reverse-movement changing mechanism 40 includes at least a planetary gear drive 41, a forward clutch 42, and a reverse brake 43.

The planetary gear drive 41 includes a sun gear 44, a pinion 45, and a ring gear 46.

The sun gear 44 is splined in a coupling member (not shown). The coupling member is splined in a primary pulley shaft 51 of the later-mentioned primary pulley 50. Accordingly, the output torque transmitted from the internal combustion engine 10 to the sun gear 44 is transmitted to the primary pulley shaft 51.

The pinion 45 engages the sun gear 44, and the plural pinions 45 (for example, three pinions) are arranged around the sun gear 44. Each pinion 45 is held by a changing carrier 47. The changing carrier 47 is located around the sun gear 44, and the changing carrier 47 integrally supports the pinions 45 while the pinions 45 can orbit the changing carrier 47. The changing carrier 47 is connected to the reverse brake 43 in an outer peripheral end portion thereof.

The ring gear 46 engages each pinion 45 held by the changing carrier 47, and the ring gear 46 is connected to the input shaft 38 of the torque converter 30 through the forward clutch 42.

ON/OFF control of the forward clutch 42 is performed through the working oil supplied from the working oil supply control device (not shown) to a hollow unit (not shown) of the input shaft 38. In the case where the forward clutch 42 is turned OFF, the output torque transmitted from the internal combustion engine 10 to the input shaft 38 is transmitted to the ring gear 46. On the other hand, in the case where the forward clutch 42 is turned ON, the output torque transmitted from the internal combustion engine 10 to the input shaft 38 is directly transmitted to the sun gear 44 while the ring gear 46, the sun gear 44, and each pinion 45 are not relatively rotated.

ON/OFF control of the reverse brake 43 is performed by a brake piston (not shown) to which the working oil is supplied from the working oil supply control device (not shown). In the case where the reverse brake 43 is turned ON, the changing carrier 47 is fixed to the transaxle case 22, which allows each pinion 45 not to orbit around the sun gear 44. In the case where the reverse brake 43 is turned OFF, the changing carrier 47 is released, which allows each pinion 45 to orbit the sun gear 44.

The primary pulley 50 of the belt type continuously variable transmission 1-1 transmits the output torque, transmitted from the internal combustion engine 10 through the forward-and-reverse-movement changing mechanism 40, to the secondary pulley 60 by a later-mentioned belt 100. As shown in FIGS. 1 and 2, the primary pulley 50 includes a primary pulley shaft 51, a primary fixed sheave 52, a primary movable sheave 53, a primary partition 54, and a hydraulic chamber 55 which is of the positioning hydraulic chamber.

The primary pulley shaft 51 is rotatably supported by bearings 101 and 102. The primary pulley shaft 51 is a hollow shaft, and a working oil supply shaft 56 in which a working oil passage 56a is formed is arranged in a hollow unit (not shown) of the primary pulley shaft 51. The primary pulley shaft 51 and the working oil supply shaft 56 are partitioned into working oil passages 51a and 51b by a sealing member S such as a sealing ring. The working oil, supplied from the working oil supply control device (not shown) to a later-mentioned drive hydraulic chamber 72e, flows into the working oil passage 51a through a working oil passage 56a and communication hole 56b. The working oil supplied from the working oil supply control device (not shown) to the primary hydraulic chamber 55 flows into the working oil passage 51b.

The primary fixed sheave 52 is provided at a position where the primary fixed sheave 52 faces the primary movable sheave 53 such that the primary fixed sheave 52 is rotated along with the primary pulley shaft 51. Specifically, the primary fixed sheave 52 is formed as an annular unit which is protruded toward the radial outside from an outer periphery of the primary pulley shaft 51. That is, in the first embodiment, the primary fixed sheave 52 is integrally formed in the outer periphery of the primary pulley shaft 51.

The primary movable sheave 53 includes a cylindrical unit 53a and an annular unit 53b. The cylindrical unit 53a is formed while centered on the same axial line as that of the primary pulley shaft 51. The annular unit 53b is formed while protruded toward the radial outside from an end portion on the primary fixed sheave of the cylindrical unit 53a. A spline 53c formed in an inner peripheral surface of the cylindrical unit 53a and a spline 51c formed in an outer peripheral surface of the primary pulley shaft 51 are splined each other. Therefore, the primary movable sheave 53 is supported by the primary pulley shaft 51 while the primary movable sheave 53 is slidably in an axial direction. A V-shaped primary groove 100a is formed between the primary fixed sheave 52 and the primary movable sheave 53, i.e., between the surface facing the primary movable sheave 53 of the annular unit (not shown) of the primary fixed sheave 52 and the surface facing the primary fixed sheave 52 of the annular unit 53b of the primary movable sheave 53.

An annular projection unit 53d is formed near the outer peripheral end portion of the in annular unit 53b of the primary movable sheave 53. The annular projection unit 53d is protruded toward the other direction in the axial direction, namely, the annular projection unit 53d is protruded toward the primary partition side. A supply-side communication passage 53e communicating the inner peripheral surface and the outer peripheral surface is formed near the end portion on the primary fixed sheave side in the cylindrical unit 53a of the primary movable sheave 53. The supply-side communication passage 53e has a cylindrical shape. The plural supply-side communication passages 53e are formed on a circumference of the cylindrical unit 53a, e.g., the three supply-side communication passages 53e are formed at equal intervals. An annular step unit 53f choked by a ball 71a of a later-mentioned supply-side valve 71 is formed in the supply-side communication passage 53e. The working oil supplied from the working oil supply control device (not shown) to the primary hydraulic chamber 55 flows into the working oil passage 51b, and the working oil flows into the supply-side communication passage 53e through the communication hole 51e. That is, the supply-side communication passage 53e supplies the working oil to the primary hydraulic-chamber 55.

As shown in FIGS. 2, 3-1, and 3-2, the primary partition 54 is provided at the position where the primary movable sheave 53 is sandwiched between the primary partition 54 and the primary pulley shaft 51 while the primary partition 54 faces the primary fixed sheave 52 in the axial direction. The primary partition 54 is provided so as to be rotated along with the primary pulley shaft 51. The primary partition 54 is of an annular member, and a discharge-side communication passage 54a communicating both side surfaces (not shown) facing each other in the axial direction is formed near a radial center portion of the primary partition 54. The discharge-side communication passage 54a has the cylindrical shape. The discharge-side communication passages 54a are formed on the circumference of the primary partition 54, e.g., the three discharge-side communication passages 54a are formed at equal intervals. An annular protrusion 54c choked by a ball 72a of a later-mentioned discharge-side control valve 72 is formed in the discharge-side communication passage 54a. In the discharge-side communication passage 54a, a choking member 54b is inserted into and fixed to one end portion, i.e., the end portion located on the opposite side to the primary fixed sheave side. Accordingly, the discharge-side communication passage 54a is formed such that only the other end portion, i.e., only the end portion on the primary fixed sheave side is opened to the primary hydraulic chamber 55.

In the primary partition 54, a driving-side passage 54d and a discharge-side passage 54e are formed corresponding to each discharge-side communication passage 54a. In the driving-side passage 54d, one of end portions is communicated with the working oil passage 51a through a communication hole 51d, and the other end portion is choked by a choking member 54f. As shown in FIG. 3B, the driving-side passage 54d is opened to the discharge-side communication passage 54a in the middle of the passage. At this point, the driving-side passage 54*d* is opened in the range between the choking member 54*b* and the protrusion 54*c* in the discharge-side communication passage 54*a*. Further, the driving-side passage 54*d* is opened to the drive hydraulic chamber 72*e* formed between the choking member 54*b* and a valve opening member 72*d* of the later-mentioned discharge-side control valve 72, and the driving-side passage 54*d* is not opened to a discharge space unit 72*f* formed between the valve opening member 72*d* and the protrusion 54*c*. That is, the driving-side passage 54*d* is communicated only with the drive hydraulic chamber 72*e* in the discharge-side communication passage 54*a*. Accordingly, the working oil flowing from the working oil passage 51*a* into the driving-side passage 54*d* is supplied only to the drive hydraulic chamber 72*e*.

As shown in FIGS. 3A and 3B, in the discharge-side passage 54*e*, one of end portions is communicated with the discharge space unit 72*f*, and the other end portion is opened to the portion except for the outer peripheral surface constituting the primary hydraulic chamber 55 in the outer peripheral surface of the primary partition 54. That is, the discharge-side communication passage 54*a* discharges the working oil of the primary hydraulic chamber 55 to the outside. In the first embodiment, the discharge-side communication passage 54*a* discharges the working oil to the transaxle 20 through the discharge-side passage 54*e*. The discharge-side passage 54*e* is directly communicated with the outside of the primary hydraulic chamber 55. Accordingly, because an increase in length of the discharge-side passage 54*e* can be suppressed, resistance can be suppressed while the working oil flows through the discharge-side passage 54*e*. This enables a discharge speed of the working oil of the primary hydraulic chamber 55 to be increased to improve a speed-change speed of the transmission gear ratio. It is not necessary to form the new passage in the primary pulley shaft 51, the working oil supply shaft 56, and the like, so that the belt type continuously variable transmission can be prevented from upsizing when compared with the conventional belt type continuously variable transmission.

In the first embodiment, the discharge-side passage 54*e* is formed in the opposite direction to an arrow A direction in a tangential direction in the portions communicated with the discharge space unit 72*f*. The arrow A direction is one in which the primary partition 54 (primary pulley shaft 51) is rotated by the output torque (makes the vehicle forward) transmitted from the internal combustion engine 10. Accordingly, the working oil of the discharge space unit 72*f* flows easily into the discharge-side passage 54*e* by the rotating force in rotating (particularly in accelerating) the primary partition 54 (primary pulley shaft 51). The working oil passing through the discharge-side passage 54*e* is easily discharged to the outside by centrifugal force in rotating (particularly in accelerating) the primary partition 54 (primary pulley shaft 51). Therefore, the discharge speed of the working oil of the primary hydraulic chamber 55 can further be increased, and the speed-change speed of the transmission gear ratio can be improved.

The discharge-side passage 54*e* is preferably formed in the range from the opposite direction to the direction, in which the primary partition 54 is rotated by the output torque (makes the vehicle forward) transmitted from the internal combustion engine 10, in the tangential direction of the primary partition 54 to the radially outside direction in a normal direction of the primary partition 54. For example, the discharge-side passage 54*e* may be formed toward the radially outside direction in the normal direction in the portions communicated with the discharge space unit 72*f*.

The primary hydraulic chamber 55 is a positioning hydraulic chamber which presses the primary movable sheave 53 against the primary fixed sheave side. As shown in FIG. 2, the primary hydraulic chamber 55 is a space unit formed by the primary movable sheave 53 and the primary partition 54. At this point, the sealing members S such as the sealing rings are provided between the projection unit 53*d* of the primary movable sheave 53 and the primary partition 54 and between the cylindrical unit 53*a* of the primary movable sheave 53 and the primary partition 54 respectively. That is, the space unit formed by the primary movable sheave 53 and primary partition 54, which constitute the primary hydraulic chamber 55, is sealed by the sealing members S.

The working oil flowing into the working oil passage 51*a* of the primary pulley shaft 51 is supplied to the primary hydraulic chamber 55. That is, the working oil is supplied to the primary hydraulic chamber 55, the primary movable sheave 53 is caused to slide in the axial direction by the pressure of the supplied working oil, i.e., by oil pressure P1 of the primary hydraulic chamber 55, which brings the primary movable sheave 53 close to or in contact with the primary fixed sheave 52. The primary hydraulic chamber 55 presses the primary movable sheave 53 against the primary fixed sheave side by the oil pressure P1 of the primary hydraulic chamber 55. Therefore, the belt sandwiching pressure is generated to the belt 100 entrained in the primary groove 100*a*, and the position in the axial direction of the primary movable sheave 53 is changed with respect to the primary fixed sheave 52. As a result, a function as transmission gear ratio changing means for changing the transmission gear ratio is also possessed.

The secondary pulley 60 of the belt type continuously variable transmission 1-1 is one which transmits the output torque, transmitted from the internal combustion engine 10 to the primary pulley 50 by the belt 100, the final reduction gear 80 of the belt type continuously variable transmission 1-1. As shown in FIG. 1, the secondary pulley 60 includes a secondary pulley shaft 61, a secondary fixed sheave 62, a secondary movable sheave 63, a secondary hydraulic chamber 64, and a secondary partition 65.

The secondary pulley shaft 61 is rotatably supported by bearings 103 and 104. The secondary pulley shaft 61 has the working oil passage (not shown) therein. The working oil flows into the working oil passage, and the working oil is a working fluid supplied from the working oil supply control device (not shown) to the secondary hydraulic chamber 64.

The secondary fixed sheave 62 is provided at the position, where the secondary fixed sheave 62 faces the secondary movable sheave 63, such that the secondary fixed sheave 62 is rotated along with the secondary pulley shaft 61. Specifically, for example, the secondary fixed sheave 62 is formed as an annular unit which is protruded toward the radial outside from the outer periphery of the secondary pulley shaft 61. That is, the secondary fixed sheave 62 is integrally formed in the outer periphery of the secondary pulley shaft 61.

A spline (not shown) formed in the inner peripheral surface of the secondary movable sheave 63 and a spline (not shown) formed in the outer peripheral surface of the secondary pulley shaft 61 are splined each other. Therefore, the secondary movable sheave 63 is supported by the secondary pulley shaft 61 while the secondary movable sheave 63 is slidable in the axial direction. A V-shaped primary groove 100*b* is formed between the secondary fixed sheave 62 and the secondary movable sheave 63, i.e., between the surface facing the secondary movable sheave 63 of the secondary fixed sheave 62 and the surface facing the secondary fixed sheave 62 of the secondary movable sheave 63. The reference numeral 66 denotes a parking brake gear.

The secondary hydraulic chamber 64 presses the secondary movable sheave 63 against the secondary fixed sheave side. As shown in FIG. 1, the secondary hydraulic chamber 64 is a space unit formed by the secondary movable sheave 63 and the disc-shaped secondary partition 65 fixed to the secondary pulley shaft 61. An annular projection unit 63a is formed in the secondary movable sheave 63. The projection unit 63a is protruded toward one direction of the axial direction, i.e., toward the side of the final reduction gear 80. On the other hand, an annular projection unit 65a is formed in the secondary partition 65. The projection unit 65a is protruded toward the other direction of the axial direction, i.e., toward the side of the secondary movable sheave 63. The sealing member such as the sealing ring is provided between projection unit 63a and the projection unit 65a. That is, the space unit formed by the secondary movable sheave 63 and secondary partition 65, which constitute the secondary hydraulic chamber 64, is sealed by the sealing member S (not shown).

The working oil flowing into the working oil passage (not shown) of the secondary pulley shaft 61 is supplied to the secondary hydraulic chamber 64 through a working oil supply hole (not shown). That is, the working oil is supplied to the secondary hydraulic chamber 64, the secondary movable sheave 63 is caused to slide in the axial direction by the pressure of the supplied working oil, i.e., by the oil pressure of the secondary hydraulic chamber 64, which brings the secondary movable sheave 63 close to or in contact with the secondary fixed sheave 62. The secondary hydraulic chamber 64 presses the secondary movable sheave 63 against the secondary fixed sheave side by the oil pressure of the secondary hydraulic chamber 64. Therefore, the belt sandwiching pressure is generated to the belt 100 entrained in the primary groove 100b, and the contact radiuses to the primary pulley 50 and the secondary pulley 60 of the belt is kept constant. The belt sandwiching force may be generated using the secondary hydraulic chamber 64 and a torque cam device.

The communication unit 70 is one which permits the working oil to be supplied from the outside to the primary hydraulic chamber 55, which is of a positioning hydraulic chamber, while controlling permission or prohibition of the working oil to the outside from the primary hydraulic chamber 55. In the first embodiment, the communication unit 70 is provided at least one of the primary movable sheave 53 and the primary fixed sheave 52 (primary partition 54 which is of the member fixed to the primary fixed sheave 52). The communication unit 70 includes a supply-side valve 71 and a discharge-side control valve 72.

The supply-side valve 71 permits only the supply of the working oil from the outside to the primary hydraulic chamber 55, namely, the supply-side valve 71 prohibits the discharge of the working oil to the outside from the primary hydraulic chamber 55. The supply-side valve 71 is arranged in the supply-side communication passage 53e. The supply-side valve 71 is a check valve including a ball 71a, an elastic member 71b, and a latching member 71c. The supply-side valve 71 is arranged on the primary hydraulic chamber side of the step unit 53f of the supply-side communication passage 53e. A diameter of the ball 71a is larger than that of the step unit 53f. The elastic member 71b is arranged while biased between the ball 71a and the latching member 71c fixed near the end portion on the primary hydraulic chamber side of the supply-side communication passage 53e. The elastic member 71b generates the pressing force in the direction in which the ball 71a comes into contact with the step unit 53f, and the pressing force acts on the ball 71a. The latching member 71c has the disc shape, and an opening (not shown) is formed in the center portion of the latching member 71c.

The ball 71a is moved in the direction in which the ball 71a is separated from the step unit 53f to open the supply-side valve 71, when the oil pressure on the primary pulley shaft side from the step unit 53f of the supply-side communication passage 53e exceeds the pressing force of the elastic member 71b. That is, the supply-side valve 71 is the check valve which is opened in the direction in which the working oil is supplied from the outside to the primary hydraulic chamber 55. The oil pressure P1 of the primary hydraulic chamber 55 acts on the ball 71a, and the ball 71a acts in the direction in which the ball 71a comes into contact with the step unit 53f. Therefore, even if the oil pressure P1 of the primary hydraulic chamber 55 is increased, the ball 71a is never separated from the step unit 53f. Accordingly, the closed state of the supply-side valve 71 is maintained as long as the oil pressure on the primary pulley shaft side from the step unit 53f of the supply-side communication passage 53e exceeds the pressing force of the elastic member 71b.

The supply-side valve 71 is arranged in the radial inside of the primary movable sheave 53 with respect to the discharge-side control valve 72. The centrifugal force acts on the ball 71a of the supply-side valve 71 in operating the belt type continuously variable transmission 1-1, i.e., in rotating (particularly accelerating) the primary movable sheave 53. The centrifugal force is changed by the position of the primary movable sheave 53 in which the supply-side valve 71 is formed. For example, in the case where the supply-side valve 71 is arranged in the radial outside of the primary movable sheave 53 with respect to the discharge-side control valve 72, the centrifugal force acting on the ball 71a is increased when compared with the case where the supply-side valve 71 is arranged in the radial inside of the primary movable sheave 53 with respect to the discharge-side control valve 72. In the first embodiment, since the supply-side valve 71 is arranged in the radial inside of the primary movable sheave 53 with respect to the discharge-side control valve 72, the force acting on the supply-side valve which is generated in operating the belt type continuously variable transmission, i.e., the centrifugal force acting on the ball 71a can be decreased when compared with the case where the supply-side valve 71 is arranged in the radial outside of the primary movable sheave 53.

The supply-side valve 71 is arranged so as to be opened toward the radial outside of the primary movable sheave 53, so that the centrifugal force acts on the ball 71a in the direction the ball 71a is separated from the step unit 53f. In the case where the oil pressure P1 of the primary hydraulic chamber 55 is in a low state, for example, discharge-side control valve 72 is in the opened state, there is a fear that the force, in which the centrifugal force and the oil pressure on the primary pulley shaft side from the step unit 53f of the supply-side communication passage 53e are combined, exceeds the pressing force of the elastic member 71b. That is, because the supply-side valve 71 is arranged so as to be opened toward the radial outside of the primary movable sheave 53, the supply-side valve 71 is easily opened by the force generated in operating the belt type continuously variable transmission, i.e., by the centrifugal force. Therefore, there is a fear that the speed-change speed is decreased in the case where the transmission gear ratio of the belt type continuously variable transmission 1-1 is changed, particularly in the case where the transmission gear ratio is set toward the maximum from the minimum. However, as described above, the supply-side valve 71 is arranged in the radial inside of the primary movable sheave 53 with respect to the discharge-side control valve 72, and the centrifugal force acting on the ball 71a can be decreased. Therefore, the increase in pressing force for opening the supply-side valve 71 can be suppressed, and the miniaturization of the belt type continuously variable transmission 1-1 can be achieved.

Because the supply-side valve 71 is arranged in the radial inside of the primary movable sheave 53 with respect to the discharge-side control valve 72, the cylindrical unit 53a of the primary movable sheave 53 is increased in a radial thickness. That is, the thickness can be increased in the coupling portion of the cylindrical unit 53a and the annular unit 53b, i.e., in the inner-diameter corner portion (not shown). The inner-diameter corner portion is a place where the stress is concentrated in the primary movable sheave 53. Accordingly, the rigidity of the primary movable sheave 53 is improved, and the durability, the transmission efficiency, and the like of the belt type continuously variable transmission 1-1 can be improved. The discharge-side control valve 72 arranged in the primary partition 54 is located in the radial outside of the primary movable sheave 53 with respect to the supply-side valve 71, so that the thickness of the radial outside can be increased larger than the portion (in the first embodiment, the center portion) where the discharge-side control valve 72 of the primary partition 54 is arranged. Accordingly, the rigidity of the primary partition 54 is improved, and deformation of the primary partition 54 can be decreased even if the oil pressure P1 of the primary hydraulic chamber 55 is increased. This enables the improvement of responsibility of the belt sandwiching force by the primary hydraulic chamber 55.

The discharge-side control valve 72 controls the permission or prohibition of the working oil to the outside from the primary hydraulic chamber 55, and the discharge-side control valve 72 is arranged in the discharge-side communication passage 54a. The discharge-side control valve 72 includes a check valve and an actuator. The check valve includes the ball 72a, an elastic member 72b, and a latching member 72c. The actuator includes the valve opening member 72d and the drive hydraulic chamber 72e. In the discharge-side control valve 72, the members (the ball 72a, the elastic member 72b, and the latching member 72c) which constitute the check valve are arranged on the primary hydraulic chamber side of the protrusion 54c of the discharge-side communication passage 54a. The ball 72a has the diameter larger than the inner diameter of the protrusion 54c. The elastic member 72b is arranged while biased between the ball 72a and the latching member 72c fixed near the end portion on the primary hydraulic chamber side of the discharge-side communication passage 54a. The elastic member 72b generates the pressing force in the direction in which the ball 72a comes into contact with the protrusion 54c, and the pressing force acts on the ball 72a. The latching member 72c has the disc shape, and the opening (not shown) is formed in the center portion of the latching member 72c.

The valve opening member 72d has the cylindrical shape. The valve opening member 72d is arranged on the side of the protrusion 54c of the discharge-side communication passage 54a which is opposite the primary hydraulic chamber, and the valve opening member 72d is slidably arranged in the axial direction of the discharge-side communication passage 54a. A projection unit (not shown) is formed in one end portion in the axial direction of the valve opening member 72d, i.e., in the end portion on the primary hydraulic chamber side. The valve opening member 72d slides onto the primary hydraulic chamber by the oil pressure of the drive hydraulic chamber 72e, which brings a leading end portion of the projection unit into contact with the ball 72a. When the pressing force of the valve opening member 72d, i.e., the oil pressure of the drive hydraulic chamber 72e exceeds the pressing force of the elastic member 72b, the ball 72a is moved in the direction in which the ball 72a is separated from the protrusion 54c, and the discharge-side control valve 72 is opened. The oil pressure P1 of the primary hydraulic chamber 55 also acts on the ball 72a. However, because the oil pressure P1 acts on the ball 72a in the direction in which the ball 72a comes into contact with the protrusion 54c, the ball 72a is never separated from the protrusion 54c even if the oil pressure P1 of the primary hydraulic chamber 55 is increased. Accordingly, the closed state of the discharge-side control valve 72 is maintained as long as the oil pressure of the driving-side passage 54d exceeds the pressing force of the elastic member 72b.

In this case, the discharge-side control valve 72 is arranged so as to be opened toward one direction in the axial direction of the primary movable sheave 53, i.e., toward the primary hydraulic chamber side. Accordingly, the centrifugal force acts on the ball 72a in the direction orthogonal to the direction in which the ball 72a is brought into contact with or separated from the protrusion 54c. Therefore, the influence of the discharge-side control valve 72 on the on-off valve can be decreased. In the discharge-side control valve 72, the oil pressure of the drive hydraulic chamber 72e is used as the actuator. However, the invention is not limited to the oil pressure of the drive hydraulic chamber 72e, but rotating force or electromagnetic force of a motor may be used.

The power transmission path 90 is arranged between the secondary pulley 60 and the final reduction gear 80. The power transmission path 90 includes an intermediate shaft 91, a counter drive pinion 92, a counter driven gear 93, and a final drive pinion 94 which are parallel to the secondary pulley shaft 61. The intermediate shaft 91 is rotatably supported by bearings 105 and 106. The counter drive pinion 92 is fixed to the portion extending onto the side, where the parking brake gear 66 is not fixed, in the axial line direction of the secondary pulley shaft 61. The counter drive pinion 92 is rotatably held by bearings 107 and 108. The counter driven gear 93 is fixed to the intermediate shaft 91, and the counter driven gear 93 engages the counter drive pinion 92. The final drive pinion 94 is fixed to the intermediate shaft 91.

The final reduction gear 80 of the belt type continuously variable transmission 1-1 transmits the output torque, transmitted from the internal combustion engine 10 through the power transmission path 90, to the road surface from wheels 110 and 110. The final reduction gear 80 includes a differential gear case 81, a pinion shaft 82, differential gear pinions 83 and 84, and side gears 85 and 86, in which hollow units are formed.

The differential gear case 81 is rotatably supported by bearings 87 and 88. A ring gear 89 is provided in the outer periphery of the differential gear case 81, and the ring gear 89 engages the final drive pinion 94. The pinion shaft 82 is attached to the hollow unit of the differential gear case 81. The differential gear pinions 83 and 84 are rotatably attached to the pinion shaft 82. The side gears 85 and 86 engage both the differential gear pinions 83 and 84. The side gears 85 and 86 are fixed to drive shafts 111 and 112 respectively.

In the drive shafts 111 and 112, the side gears 85 and 86 are fixed to one of end portions, and the wheels 110 and 110 are attached to the other end portion.

The belt 100 of the belt type continuously variable transmission 1-1 transmits the output torque, transmitted from the internal combustion engine 10 through the primary pulley 50, to the secondary pulley 60. As shown in FIG. 1, the belt 100, primary pulley 50 is entrained between the primary groove 100a and the secondary groove 100b of the secondary pulley 60. The belt 100 is an endless belt formed by many metal dies and plural steel rings.

Then, an operation of the belt type continuously variable transmission 1-1 according to the first embodiment will be described. First general forward and reverse movements of the vehicle will be described. When a driver selects a forward position with a shift position device (not shown) provided in the vehicle, an ECU (Electronic Control Unit) (not shown) turns the forward clutch 42 ON and the reverse brake 43 OFF to control the forward-and-reverse-movement changing mechanism 40 by the working oil supplied from the working oil supply control device (not shown), which results in a direct coupling state of input shaft 38 and the primary pulley shaft 51. That is, the sun gear 44 of the planetary gear drive 41 and the ring gear 46 are directly coupled with each other to rotate the primary pulley shaft 51 in the same direction as the rotating direction of the crank shaft 11 of the internal combustion engine 10, which transmits the output torque from the internal combustion engine 10 to the primary pulley 50. The output torque transmitted to the primary pulley 50 from the internal combustion engine 10 is transmitted to the secondary pulley 60 through the belt 100 to rotate the secondary pulley shaft 61 of the secondary pulley 60.

The output torque transmitted to the secondary pulley 60 from the internal combustion engine 10 is transmitted from the secondary pulley shaft 61 to the intermediate shaft 91 through the counter drive pinion 92 and counter driven gear 93 of the power transmission path 90 to rotate the intermediate shaft 91. The output torque transmitted to the intermediate shaft 91 is transmitted to the differential gear case 81 of the final reduction gear 80 through the final drive pinion 94 and the ring gear 89 to rotate the differential gear case 81. The output torque to the differential gear case 81 from the internal combustion engine 10 is transmitted to the drive shafts 111 and 112 through the differential gear pinions 83 and 84 and the side gears 85 and 86, and the output torque is transmitted to the wheels 110 and 110 which are attached to the end portions of the drive shafts 111 and 112 respectively, which allows the vehicle to be moved forward.

On the other hand, when the driver selects a reverse position with the shift position device (not shown) provided in the vehicle, the ECU (not shown) turns the forward clutch 42 OFF and the reverse brake 43 ON to control the forward-and-reverse-movement changing mechanism 40 by the working oil supplied from the working oil supply control device (not shown). Therefore, the changing carrier 47 of the planetary gear drive 41 is fixed to the transaxle case 22, and each pinion 45 is held in the changing carrier 47 only so as to rotate on its axis. Accordingly, the ring gear 46 is rotated in the same direction as the input shaft 38, each pinion 45 engaging the ring gear 46 is also rotated in the same direction as the input shaft 38, and the sun gear 44 engaging each pinion 45 is rotated in the direction opposite to the input shaft 38. That is, the primary pulley shaft 51 coupled with the sun gear 44 is rotated in the direction opposite to the input shaft 38. Therefore, the secondary pulley shaft 61 of the secondary pulley 60, the intermediate shaft 91, the differential gear case 81, the drive shafts 111 and 112, and the like are rotated in the direction opposite to the case where the driver selects the forward position, which allows the vehicle to be moved in the reverse direction.

The ECU (not shown) controls the transmission gear ratio of the belt type continuously variable transmission 1-1 such that the operating state of the internal combustion engine 10 becomes the optimum based on predetermined conditions such as vehicle speed and an accelerator opening of the driver and a map (for example, an optimum fuel consumption curve based on the number of revolutions of the engine and a throttle opening) stored in a storage unit of the ECU. The control of the transmission gear ratio of the belt type continuously variable transmission 1-1 contains transmission gear ratio change and speed-change fixation (transmission gear ratio γ steady state). The transmission gear ratio change and the fixation of the transmission gear ratio are performed by controlling the oil pressure of the primary hydraulic chamber 55, which is of the positioning hydraulic chamber of the primary pulley 50, and the oil pressure of the drive hydraulic chamber 72e.

In the transmission gear ratio change, the primary movable sheave 53 slides in the axial direction of the primary pulley shaft 51 to adjust a gap between the primary fixed sheave 52 and the primary movable sheave 53, i.e., the width of the primary groove 100a by mainly supplying the working oil from the outside to the primary hydraulic chamber 55 or by discharging the working oil from the primary hydraulic chamber 55 to the outside. Therefore, the contact radius of the belt 100 is changed in the primary pulley 50, and the transmission gear ratio which is of a ratio of the number of revolutions of the primary pulley 50 and the number of revolutions of the secondary pulley 60 is controlled in the non-stage (continuously) manner. The transmission gear ratio fixation is mainly performed by prohibiting the discharge of the working oil to the outside from the primary hydraulic chamber 55.

In the secondary pulley 60, the belt sandwiching force for sandwiching the belt 100 between the secondary fixed sheave 62 and the secondary movable sheave 63 is adjusted by controlling the oil pressure of the working oil supplied to the secondary hydraulic chamber 64 from the working oil supply control device (not shown). Therefore, belt tension of the belt 100 entrained between the primary pulley 50 and the secondary pulley 60 is adjusted.

The transmission gear ratio change contains a change in which the transmission gear ratio is set from the minimum toward the maximum (hereinafter referred to as "transmission gear ratio decrease change") and a change in which the transmission gear ratio is set from the minimum toward the maximum (hereinafter referred to as "transmission gear ratio increase change"). The transmission gear ratio decrease change and the transmission gear ratio increase change will be described below.

In the transmission gear ratio decrease change, the working oil is supplied from the outside to the primary hydraulic chamber 55 to cause the primary movable sheave 53 to slide to the primary fixed sheave side. As shown in FIG. 4, the supply-side valve 71 is opened to permit the working oil to be supplies from the outside to the primary hydraulic chamber 55. Specifically the working oil is supplied onto the primary pulley shaft side beyond the step unit 53f of the supply-side communication passage 53e through the working oil passage 51b and the communication hole 51e to increase the oil pressure on the primary pulley shaft side by the working oil supply control device (not shown). When the oil pressure exceeds the pressing force of the elastic member 71b, the ball 71a is moved in the direction, in which the ball 71a is separated from the step unit 53f, to open the supply-side valve 71.

When the supply-side valve 71 is opened, as shown by an arrow B of FIG. 4, the working oil on the primary pulley shaft side beyond the step unit 53f of the supply-side communication passage 53e passes through the opening (not shown) of the latching member 71c and the supply-side communication passage 53e, and the working oil is supplied to the primary hydraulic chamber 55. At this point, the supply of the working oil is stopped from the working oil supply control device (not shown) to the drive hydraulic chamber 72e. That is, the discharge-side control valve 72 maintains the closed state, which prohibits the discharge of the working oil to the outside from the primary hydraulic chamber 55. Accordingly, the pressure P1 of the primary hydraulic chamber 55 is increased by the supplied working oil, and the pressing force for pressing the primary movable sheave 53 onto the primary fixed sheave side is increased to cause the primary movable sheave 53 to slide onto the primary fixed sheave side in the axial direction. Therefore, the contact radius of the belt 100 is increased in the primary pulley 50, the contact radius of the belt 100 is decreased in the secondary pulley 60, and the transmission gear ratio is changed from the maximum toward the minimum.

In the transmission gear ratio increase change, the working oil is discharged from the primary hydraulic chamber 55 to the outside, and the primary movable sheave 53 is caused to slide onto the opposite direction to the primary fixed sheave side. As shown in FIG. 5, the discharge-side control valve 72 is opened to permit the working oil to be discharged from the primary hydraulic chamber 55 to the outside. Specifically, as shown by an arrow C of FIG. 5, the working oil is supplied to the drive hydraulic chamber 72e through the driving-side passage 54d (the working oil passage 56a, the communication hole 56b, the working oil passage 51a, and the communication hole 51d) to increase the oil pressure of the drive hydraulic chamber 72e by the working oil supply control device (not shown). When the oil pressure of the drive hydraulic chamber 72e exceeds the pressing force of the elastic member 72b, the valve opening member 72d presses the ball 72a toward the direction, in which the ball 72a is separated from the protrusion 54c, to open the discharge-side control valve 72.

When the discharge-side control valve 72 is opened, as shown by an arrow D of FIG. 5, the working oil of the primary hydraulic chamber 55 flows into the discharge space unit 72f of the supply-side communication passage 53e through the opening (not shown) of the latching member 72c. At this point, the supply of the working oil is stopped from the working oil supply control device (not shown) to the primary pulley shaft side beyond the step unit 53f of the supply-side communication passage 53e. That is, because the supply-side valve 71 maintains the closed state, the discharge of the working oil is prohibited to the outside from the primary hydraulic chamber 55. The working oil flowing into the discharge space unit 72f flows into the discharge-side passage 54e, and the working oil is discharged to the outside (in the first embodiment to the transaxle 20) through the discharge-side passage 54e. Accordingly, the pressure P1 of the primary hydraulic chamber 55 is decreased by discharging the working oil to the outside from the primary hydraulic chamber 55, and the pressing force for pressing the primary movable sheave 53 onto the primary fixed sheave side is decreased to cause the primary movable sheave 53 to slide onto the opposite direction to the primary fixed sheave side in the axial direction. Therefore, the contact radius of the belt 100 is decreased in the primary pulley 50, the contact radius of the belt 100 is increased in the secondary pulley 60, and the transmission gear ratio is changed from the minimum toward the maximum.

The discharge-side control valve 72 can also control a discharge amount of the working oil discharged to the outside from the primary hydraulic chamber 55. Accordingly, the discharge amount of the working oil discharged to the outside from the primary hydraulic chamber 55 can be increased by controlling the discharge-side control valve 72, so that slide speed of the primary movable sheave 53 can be increased in the axial direction. Therefore, the transmission gear ratio change speed of the belt type continuously variable transmission 1-1 can be increased. Change-speed accuracy can be improved in changing the transmission gear ratio. Accordingly, drivability can be improved.

In the transmission gear ratio fixation, the working oil is not discharged to the outside from the primary hydraulic chamber 55, and the position of the primary movable sheave 53 is kept constant in the axial direction with respect to the primary fixed sheave 52. That the transmission gear ratio is fixed, namely, that the transmission gear ratio is kept steady is performed when the ECU (not shown) determines that the large change of the transmission gear ratio is not required in the case where the vehicle running state is stable and the like. As shown in FIG. 2, the supply-side valve 71 and the discharge-side control valve 72 are maintained in the closed state, which prohibits the discharge of the working oil to the outside from the primary hydraulic chamber 55. Specifically, the working oil supply control device (not shown) stops the supply of the working oil to the primary pulley shaft side beyond the step unit 53f of the supply-side communication passage 53e, and the working oil supply control device stops the supply of the working oil to the drive hydraulic chamber 72e. Accordingly, the oil pressure of the primary pulley shaft side beyond the step unit 53f and the oil pressure of the drive hydraulic chamber 72e do not exceed the pressing forces of the elastic members 71b and 72b respectively, the ball 71a is not separated from the step unit 53f of the supply-side communication passage 53e, and the ball 72a is not separated from the protrusion 54c of the discharge-side communication passage 54a. Therefore, the supply-side valve 71 and the discharge-side control valve 72 are maintained in the closed state, which prohibits the discharge of the working oil to the outside from the primary hydraulic chamber 55.

Even in the transmission gear ratio fixation, because the belt tension of the belt 100 is changed, there is a fear that the contact radius of the belt 100 tries to be changes in the primary pulley 50 to change the position of the primary movable sheave 53 in the axial direction with respect to the primary fixed sheave 52. As described above, because the working oil is held in the primary hydraulic chamber 55, when the position of the primary movable sheave 53 tries to be changed in the axial direction with respect to the primary fixed sheave 52, the position of the primary movable sheave 53 is kept constant in the axial direction with respect to the primary fixed sheave 52 while the oil pressure P1 of the primary hydraulic chamber 55 is change. Accordingly, because the position of the primary movable sheave 53 is kept constant in the axial direction with respect to the primary fixed sheave 52, it is not necessary that the oil pressure of the primary hydraulic chamber 55 be not increased by supplying the working oil from the outside to the primary hydraulic chamber 55. Therefore, in the transmission gear ratio fixation, it is not necessary that the oil pump included in the working oil supply control device (not shown) be driven to supply the working oil to the primary hydraulic chamber 55, so that the increase in power loss of the oil pump can be suppressed.

Like the conventional belt type continuously variable transmission, in the case where the oil pressure P1 of the primary hydraulic chamber 55 is controlled in order to keep the position of the primary movable sheave 53 constant in the axial direction with respect to the primary fixed sheave 52, there is a fear that the oil pressure P1 of the primary hydraulic chamber 55 becomes instable by leakage of the working oil in the oil pressure path through which the working oil is supplied from the outside to the primary hydraulic chamber 55. Therefore, in the conventional belt type continuously variable transmission, because it is necessary to increase the number of control valves of the oil pressure path, the miniaturization and cost reduction cannot be achieved. However, in the transmission gear ratio fixation, the position of the primary movable sheave 53 is kept constant in the axial direction with respect to the primary fixed sheave 52 by holding the working oil in the primary hydraulic chamber 55, so that the miniaturization and the cost reduction can be achieved.

Figure 6:
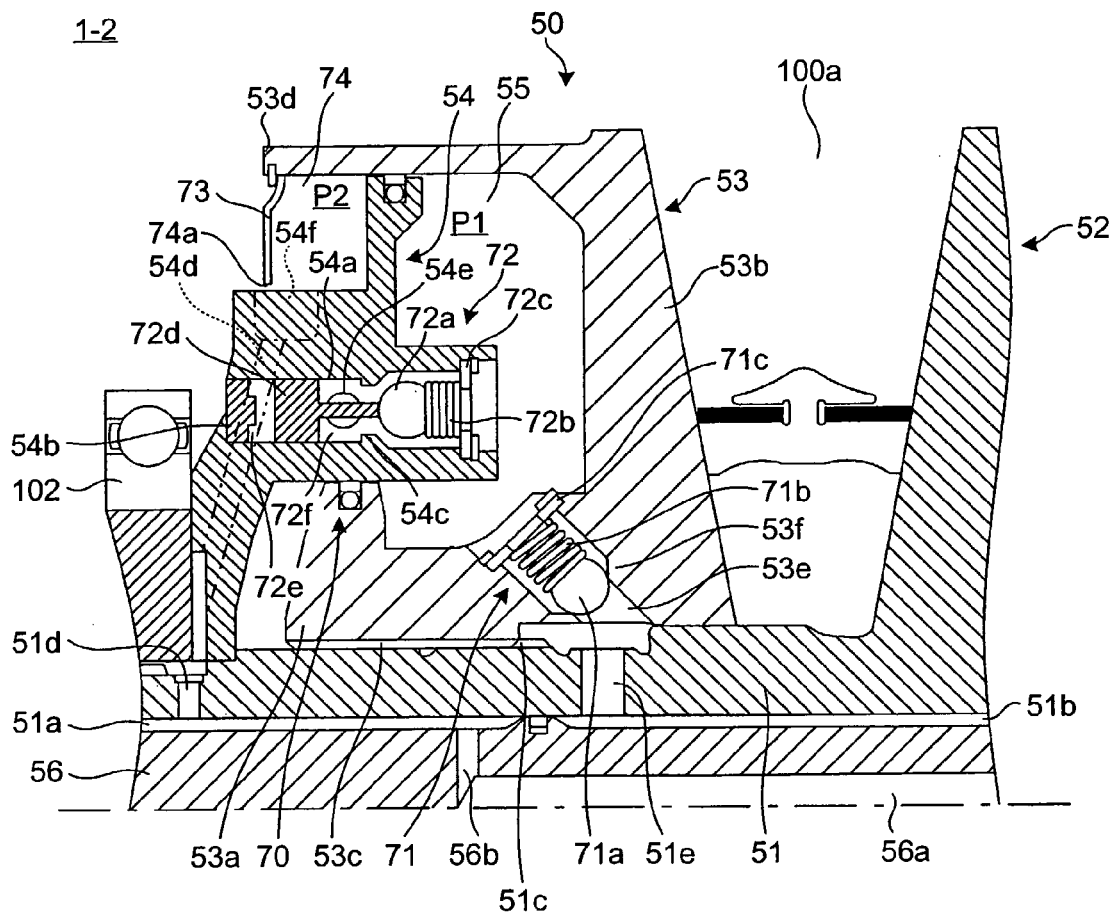
FIG. 6 is a sectional view showing a main part of a belt type continuously variable transmission according to a second embodiment.

FIG. 6 is a sectional view showing a main part of a belt type continuously variable transmission according to a second embodiment. A belt type continuously variable transmission 1-2 according to the second embodiment differs from the belt type continuously variable transmission 1-1 according to the first embodiment in that a centrifugal hydraulic chamber 74 is provided. The belt type continuously variable transmission 1-2 according to the second embodiment has the same basic configuration as the belt type continuously variable transmission 1-1 according to the first embodiment shown in FIG. 1. Therefore, the description of the basic configuration of the belt type continuously variable transmission 1-2 will be not repeated.

Generally, when the belt type continuously variable transmission is operated to rotate the primary pulley, the pressure of the radial outside is increased higher than the radial inside in the working oil of the primary hydraulic chamber. Therefore, there is a fear that the belt sandwiching force varies depending on the radial positions of the primary fixed sheave and primary movable sheave. Accordingly, even in the conventional belt type continuously variable transmission, the centrifugal hydraulic chamber is formed at the position where the centrifugal hydraulic chamber faces the primary hydraulic chamber 55 in the axial direction, which suppresses the increase in working oil pressure of the radial outside of the primary hydraulic chamber 55. However, in the conventional belt type continuously variable transmission, the working oil supply control device (not shown) supplies the working oil to the centrifugal hydraulic chamber. Accordingly, the miniaturization cannot be achieved because it is necessary to form the new passage from the working oil supply control device (not shown) to the centrifugal hydraulic chamber. In order to supply the working oil to the centrifugal hydraulic chamber, it is also necessary to drive the oil pump included in the working oil supply control device (not shown). Therefore, there is a fear that the driving loss of the oil pump is increased, and there is a fear that the transmission efficiency of the driving force is decreased in the internal combustion engine in the case where the oil pump is driven by the driving force of the internal combustion engine.

As shown in FIG. 6, an annular ring plate 73 is fixed to the projection unit 53d of the primary movable sheave 53. The ring plate 73 is fixed to the other end portion in the axial direction of the projection unit 53d, i.e., to the end portion on the opposite side to the primary hydraulic chamber side so as to be projected toward the radial inside. The centrifugal hydraulic chamber 74 is a space unit formed by the ring plate 73, the projection unit 53d, and the primary partition 54. That is, the centrifugal hydraulic chamber 74 is formed at the position where centrifugal hydraulic chamber 74 faces the primary hydraulic chamber 55, which is of the positioning hydraulic chamber, in the axial direction.

At this point, the other end portion of the discharge-side passage 54e is opened to the outer peripheral surface of the primary partition 54 which forms the centrifugal hydraulic chamber 74. That is, when the discharge-side control valve 72 permits the working oil to be discharged from the primary hydraulic chamber 55 to the outside (in this case, the centrifugal hydraulic chamber 74), the working oil discharged to the outside from the primary hydraulic chamber 55 is supplied to the centrifugal hydraulic chamber 74. A gap 74a is formed between the leading end portion of the ring plate 73 and the outer peripheral surface of the primary partition 54. Accordingly, the working oil which is discharged from the primary hydraulic chamber 55 and supplied to the centrifugal hydraulic chamber 74 passes through the gap 74a, and the working oil is discharged from the centrifugal hydraulic chamber 74 to the outside (in this case, the transaxle 20).

Thus, the working oil discharged from the primary hydraulic chamber 55 is supplied to the centrifugal hydraulic chamber 74. Accordingly, it is not necessary to form the new passage for supplying the working oil to the centrifugal hydraulic chamber 74, so that the miniaturization of the belt type continuously variable transmission 1-2 can be achieved. It is also not necessary that the oil pump included in the working oil supply control device (not shown) be driven to supply the working oil to the centrifugal hydraulic chamber 74, so that the increase in driving loss of the oil pump can further be suppressed.

Figure 7:
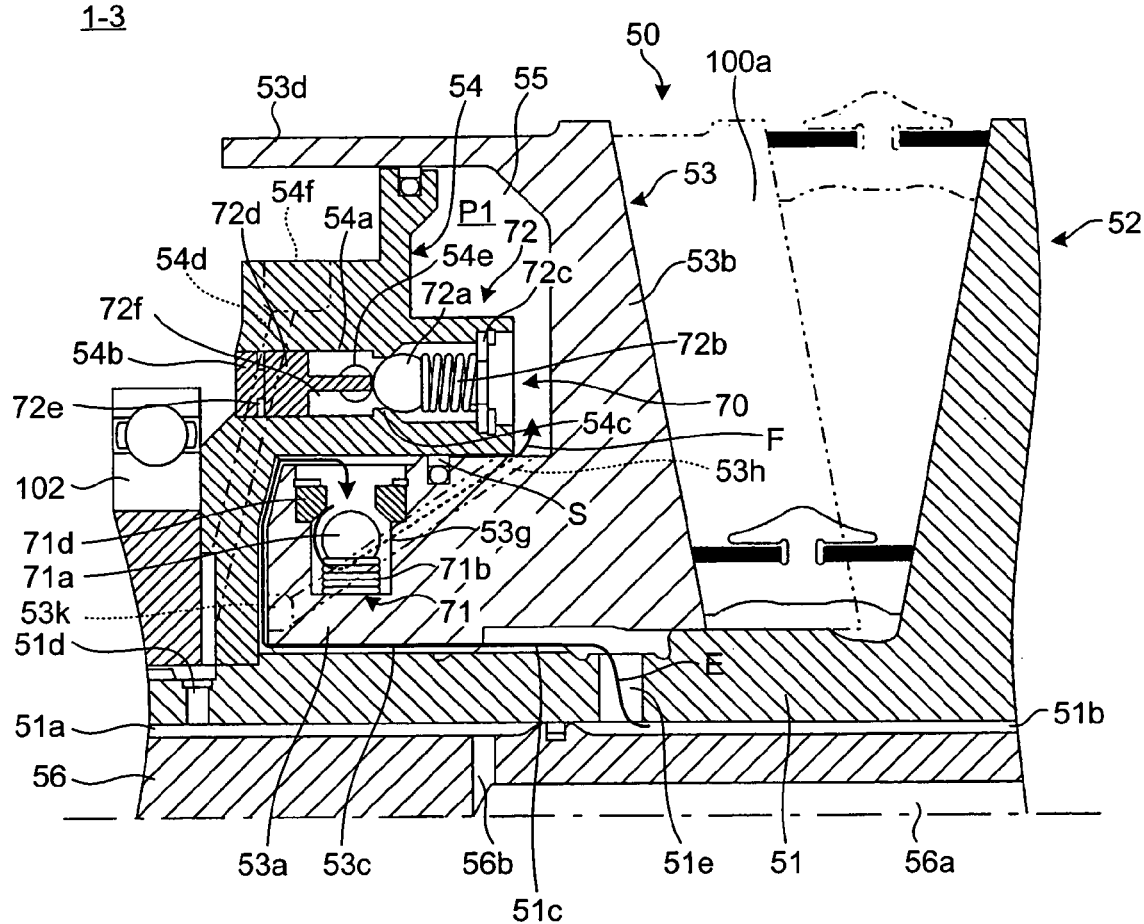
FIG. 7 is a sectional view showing a main part of a belt type continuously variable transmission according to a third embodiment.

FIG. 7 is a sectional view showing a main part of a belt type continuously variable transmission according to a third embodiment. A belt type continuously variable transmission 1-3 according to a third embodiment differs from the belt type continuously variable transmission 1-1 according to the first embodiment in arrangement position and orientation of the supply-side valve 71 with respect to the primary movable sheave 53. The belt type continuously variable transmission 1-3 according to the third embodiment has the substantially same basic configuration as the belt type continuously variable transmission 1-1 according to the first embodiment shown in FIG. 1. Therefore, the description of the basic configuration of the belt type continuously variable transmission 1-3 will be not repeated.

As shown in FIG. 7, a valve insertion unit 53g in which the supply-side valve 71 is arranged is formed in the other end portion in the axial direction of the cylindrical unit 53a of the primary movable sheave 53, namely, the valve insertion unit 53g is formed near the end portion on the opposite side to the primary fixed sheave side. The valve insertion unit 53g has the cylindrical shape. The valve insertion unit 53g is formed on the opposite side to the primary fixed sheave side beyond the sealing member S provided between the cylindrical unit 53a and the primary partition 54. That is, in the primary movable sheave 53, the supply-side valve 71 is arranged on the opposite side to the primary fixed sheave 52 beyond the space unit which is of the primary hydraulic chamber. Accordingly, it is not necessary that a hole be made in the coupling portion of the cylindrical unit 53a and the annular unit 53b, i.e., near the inner-diameter corner portion (not shown) in order to arrange the supply-side valve 71. Therefore, the decrease in rigidity of the primary movable sheave 53 can be suppressed, and the durability, the transmission efficiency, and the like of the belt type continuously variable transmission 1-3 can be improved.

The valve insertion unit 53g is opened to the outer peripheral surface of the cylindrical unit 53a. The elastic member 71b, the ball 71a, and the fixing member 71d are sequentially inserted. The ball 71a had the diameter larger than that of the opening (not shown) formed in the center portion of the fixing member 71d. The elastic member 71b is arranged between the end face (not shown) in the axial direction of the valve insertion unit 53g and the fixing member 71d, fixed to the valve insertion unit 53g, while biased through the ball 71a. The elastic member 71b generates the pressing force in the direction in which the ball 71a comes into contact with the fixing member 71d, and the pressing force acts on the ball 71a.

A supply-side passage 53h is formed in the cylindrical unit 53a of the primary movable sheave 53, and the supply-side passage 53h is opened to the valve insertion unit 53g. In the supply-side passage 53h, one of end portions is communicated with the primary hydraulic chamber 55, and the other end portion is choked by a choking member 53k.

Then, an operation of the belt type continuously variable transmission 1-3 according to the third embodiment will be described. In the basic configuration, the operation of the belt type continuously variable transmission 1-3 according to the third embodiment is substantially similar to the operation of the belt type continuously variable transmission 1-1 according to the first embodiment. However, the operation of the belt type continuously variable transmission 1-3 differs from the operation of the belt type continuously variable transmission 1-1 in the transmission gear ratio decrease change.

In the transmission gear ratio decrease change, the working oil is supplied from the outside to the primary hydraulic chamber 55 to cause the primary movable sheave 53 to slide to the primary fixed sheave side. As shown in FIG. 7, the supply-side valve 71 is opened to permit the working oil to be supplied from the outside to the primary hydraulic chamber 55. Specifically, the working oil flows into a gap (not shown) between the primary pulley shaft 51 and the primary movable sheave 53 through the working oil passage 51b and the communication hole 51e by the working oil supply control device (not shown), as shown by an arrow E of FIG. 7, the working oil passes between the spline 53c of the primary movable sheave 53 and the spline 51c of the primary pulley shaft 51 and between the cylindrical unit 53a and the primary partition 54, and the working oil is supplied to the radial outside beyond the fixing member 71d of the valve insertion unit 53g. The supplied working oil increases the oil pressure of the radial outside while the oil pressure of the radial outside is higher than that of the fixing member 71d of the valve insertion unit 53g. When the oil pressure exceeds the pressing force of the elastic member 71b, the ball 71a is moved in the direction, in which the ball 71a is separated from the fixing member 71d, to open the supply-side valve 71.

When the supply-side valve 71 is opened, as shown by an arrow F of FIG. 7, the working oil located in the radial outside beyond the fixing member 71d of the valve insertion unit 53g flows into the radial inside beyond the fixing member 71d of the valve insertion unit 53g through the opening (not shown) of the fixing member 71d, the working oil passes through the supply-side passage 53h, and the working oil is supplied to the primary hydraulic chamber 55. Therefore, the contact radius of the belt 100 is increased in the primary pulley 50, the contact radius of the belt 100 is decreased in the secondary pulley 60, and the transmission gear ratio is changed toward the minimum from the maximum. At this point, the working oil flowing into the radial inside beyond the fixing member 71d of the valve insertion unit 53g can flow into the supply-side passage 53h while the working oil does not pass between the lines constituting the elastic member 71b. Accordingly, because a passage cross-section area is stabilized in supplying the working oil from the outside to the primary hydraulic chamber 55, the supply speed of the working oil to the primary hydraulic chamber 55 can be increased, and the speed-change speed of the transmission gear ratio can be improved.

Thus, the supply-side valve 71 is arranged so as to be opened toward the radial inside of the primary movable sheave 53. Accordingly, in the case where the centrifugal force acting on the ball 71a is large, because the centrifugal force acts in the direction in which the ball 71a comes into contact with the fixing member, the opened state of the supply-side valve 71 can be maintained by the force in which the centrifugal force and the pressing force of the elastic member 71b are combined, for example, in rotating the primary pulley 50 at high speed. Therefore, the pressing force for closing the supply-side valve 71 can be decreased to achieve the miniaturization of the belt type continuously variable transmission 1-3.

Because the pressing force for closing the supply-side valve 71 can be decreased, in the case where the centrifugal force is small, for example, in the case where the primary pulley 50 is rotated at low speed like the normal running, the necessary pressure of the working oil can be decreased in performing the transmission gear ratio decrease change, i.e., in supplying the working oil from the outside to the primary hydraulic chamber 55. That is, even in the working oil having the small pressure, the working oil can be supplied to the primary hydraulic chamber 55 in changing the transmission gear ratio. Therefore, the increase in driving loss of the oil pump can further be suppressed, and the fuel consumption can be improved.

Figure 8:
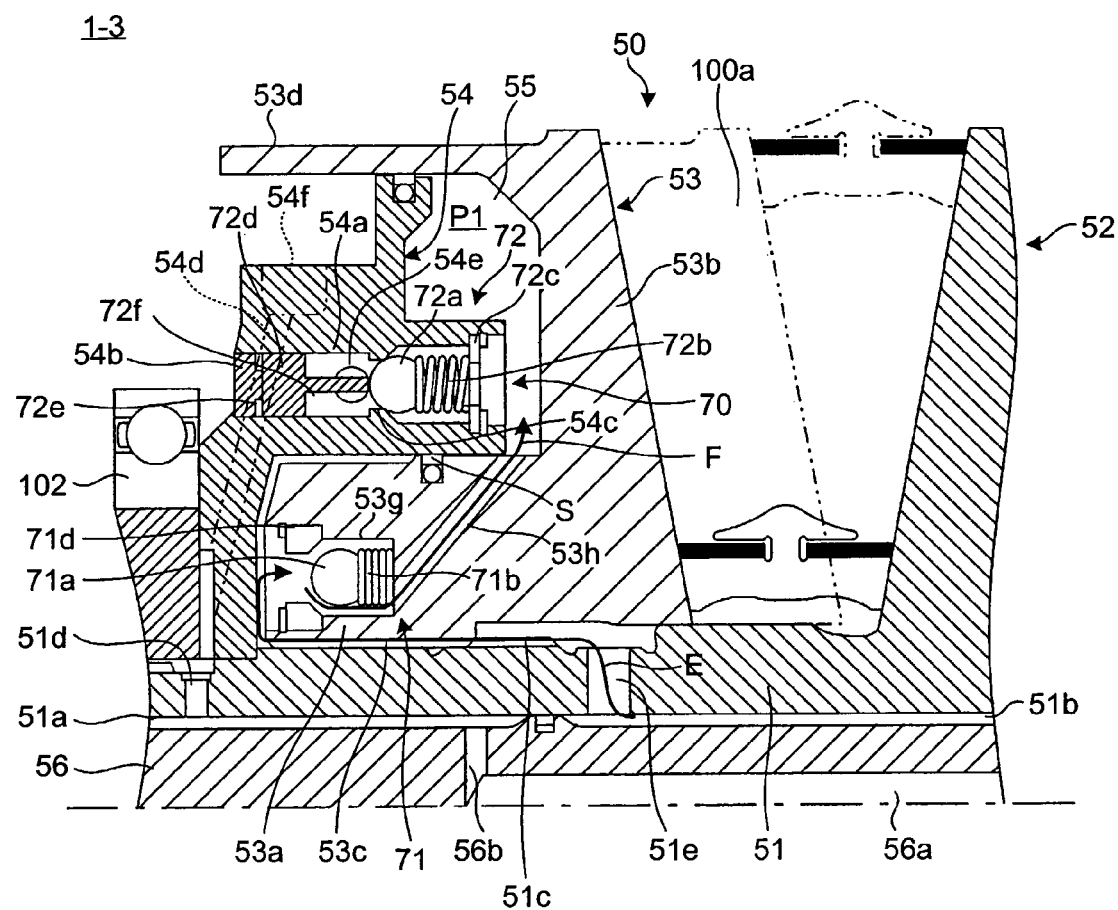
FIG. 8 is a sectional view showing another main part of the belt type continuously variable transmission according to the third embodiment.

In the third embodiment, the supply-side valve 71 is arranged so as to be opened toward the radial inside of the primary movable sheave 53. However, the invention is not limited to the third embodiment. For example, as shown in FIG. 8, the supply-side valve 71 may be arranged so as to be opened toward one direction of the axial direction of the primary movable sheave 53, i.e., toward the primary fixed sheave side.

Figure 9:
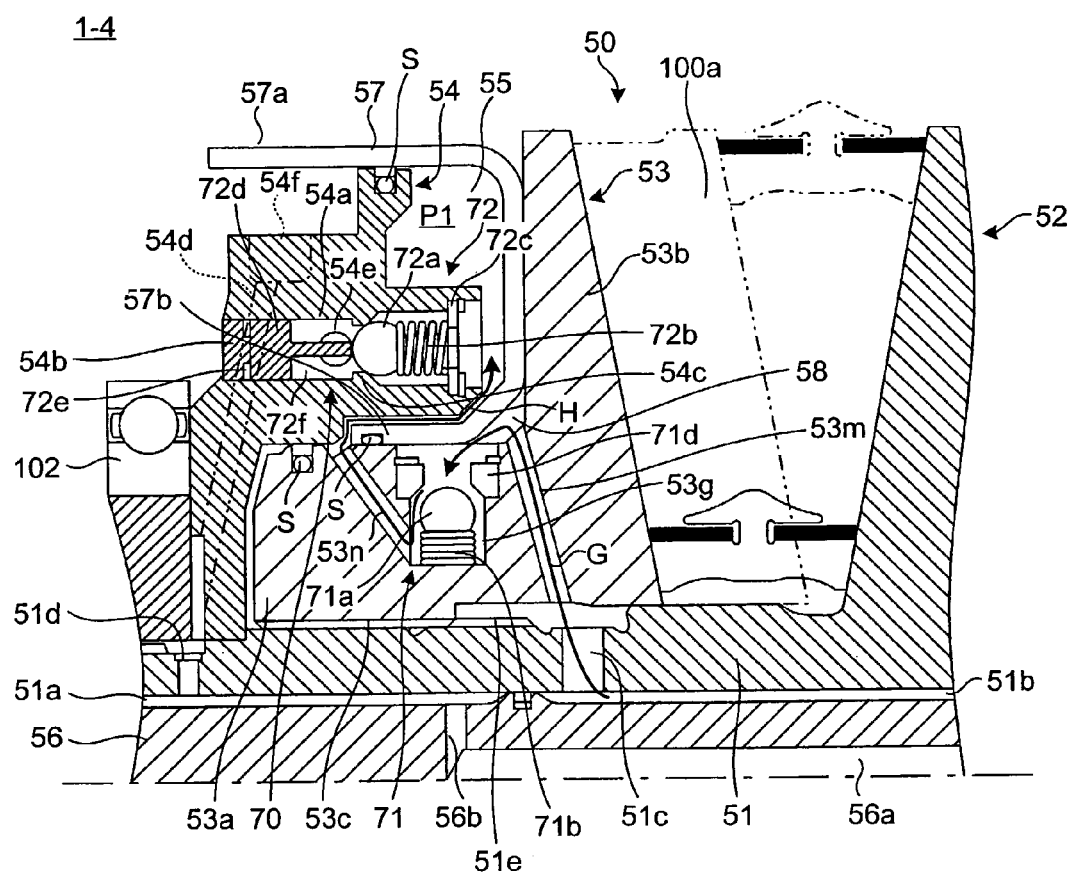
FIG. 9 is a sectional view showing a main part of a belt type continuously, variable transmission according to a fourth embodiment.

FIG. 9 is a sectional view showing a main part of a belt type continuously variable transmission according to a fourth embodiment. A belt type continuously variable transmission 1-4 according to the fourth embodiment differs from the belt type continuously variable transmission 1-1 according to the first embodiment shown in FIG. 1 in that the space unit which is of the primary hydraulic chamber 55 is not formed by the primary movable sheave 53 and the primary partition 54, but the space unit is formed by the primary partition 54 and the cylinder member 57 which is different from the primary movable sheave 53. The belt type continuously variable transmission 1-4 according to the fourth embodiment has the substantially same basic configuration as the belt type continuously variable transmission 1-1 according to the first embodiment shown in FIG. 1. Therefore, the description of the basic configuration of the belt type continuously variable transmission 1-4 will be not repeated.

As shown in FIG. 9, the cylinder member 57 whose cross section in the axial direction is formed in a U-shape is arranged between the primary movable sheave 53 and the primary partition 54. The primary hydraulic chamber 55 is the space unit formed by the cylinder member 57 and the primary partition 54. At this point, the sealing members S such as the sealing rings are provided between the projection unit 57a of the cylinder member 57 and the primary partition 54 of and between the projection unit 57b of the cylinder member 57 and the cylindrical unit 53a of the primary movable sheave 53 respectively. That is, the space unit formed by the cylinder member 57 and primary partition 54, which constitutes the primary hydraulic chamber 55, is sealed by the sealing members S.

The valve insertion unit 53g in which the supply-side valve 71 is arranged is formed near one of end portions in the axial direction of the cylindrical unit 53a of the primary movable sheave 53, i.e. near the end portion on the primary fixed sheave side. The valve insertion unit 53g has the cylindrical shape. The valve insertion unit 53g is formed on the primary fixed sheave side beyond the sealing member S provided between the cylindrical unit 53a and the primary partition 54. The valve insertion unit 53g is opened to the outer peripheral surface of the cylindrical unit 53a, and the valve insertion unit 53g is communicated with the supply chamber 58 formed between the cylinder member 57 and the primary movable sheave 53.

The elastic member 71b, the ball 71a, and the fixing member 71d are sequentially inserted into the valve insertion unit 53g. The ball 71a had the diameter larger than that of the opening (not shown) formed in the center portion of the fixing member 71d. The elastic member 71b is arranged between the end face (not shown) in the axial direction of the valve insertion unit 53g and the fixing member 71d, fixed to the valve insertion unit 53g, while biased through the ball 71a. The elastic member 71b generates the pressing force in the direction in which the ball 71a comes into contact with the fixing member 71d, and the pressing force acts on the ball 71a.

A first supply-side passage 53m and a second supply-side passage 53n are formed in the cylindrical unit 53a of the primary movable sheave 53. In the first supply-side passage 53m, one of end portions is opened to the inner peripheral surface of the cylindrical unit 53a, and the other end portion is communicated with the supply chamber 58. In the second supply-side passage 53n, one of end portions is communicated with the primary hydraulic chamber 55, and the other end portion is communicated with the valve insertion unit 53g.

Then, an operation of the belt type continuously variable transmission 1-4 according to the fourth embodiment will be described. In the basic configuration, the operation of the belt type continuously variable transmission 1-4 according to the fourth embodiment is substantially similar to the operation of the belt type continuously variable transmission 1-1 according to the first embodiment. However, the operation of the belt type continuously variable transmission 1-4 differs from the operation of the belt-type continuously variable transmission 1-1 in the transmission gear ratio decrease change.

In the transmission gear ratio decrease change, the working oil is supplied from the outside to the primary hydraulic chamber 55 to cause the primary movable sheave 53 to slide to the primary fixed sheave side. As shown in FIG. 9, the supply-side valve 71 is opened to permit the working oil to be supplied from the outside to the primary hydraulic chamber 55. Specifically, the working oil flows into a gap (not shown) between the primary pulley shaft 51 and the primary movable sheave 53 through the working oil passage 51b and the communication hole 51e by the working oil supply control device (not shown), as shown by an arrow G of FIG. 9, the working oil passes through the first supply-side passage 53m to flow into the supply chamber 58, and the working oil is supplied to the radial outside beyond the fixing member 71d of the valve insertion unit 53g. The supplied working oil increases the oil pressure of the radial outside while the oil pressure of the radial outside is higher than that of the fixing member 71d of the valve insertion unit 53g. When the oil pressure exceeds the pressing force of the elastic member 71b, the ball 71a is moved in the direction, in which the ball 71a is separated from the fixing member 71d, to open the supply-side valve 71.

When the supply-side valve 71 is opened, as shown by an arrow H of FIG. 9, the working oil located in the radial outside beyond the fixing member 71d of the valve insertion unit 53g flows into the radial inside beyond the fixing member 71d of the valve insertion unit 53g through the opening (not shown) of the fixing member 71d, the working oil passes through the supply-side passage 53m, and the working oil is supplied to the primary hydraulic chamber 55. Therefore, the contact radius of the belt 100 is increased in the primary pulley 50, the contact radius of the belt 100 is decreased in the secondary pulley 60, and the transmission gear ratio is changed toward the minimum from the maximum. At this point, the working oil flowing into the radial inside beyond the fixing member 71d of the valve insertion unit 53g can flow into the second supply-side passage 53n while the working oil does not pass between the lines constituting the elastic member 71b. Accordingly, because the passage cross-section area is stabilized in supplying the working oil from the outside to the primary hydraulic chamber 55, the supply speed of the working oil to the primary hydraulic chamber 55 can be increased, and the speed-change speed of the transmission gear ratio can be improved.

Thus, even if the primary hydraulic chamber 55 which is of the positioning hydraulic chamber is the space unit formed by the primary partition 54 and the cylinder member 57 which is the member different from the primary movable sheave, the cylinder member 57 can be used for the passage through which the working oil is supplied from the outside to the primary hydraulic chamber 55. Accordingly, the formation of the new passage can be suppressed to achieve the cost reduction.

Because the working oil is held in the primary hydraulic chamber 55 when the position of the primary movable sheave 53 is kept constant in the axial direction with respect to the primary fixed sheave 52, the oil pressure P1 of the primary hydraulic chamber 55 is higher than the oil pressure of the supply chamber 58. Accordingly, because the cylinder member 57 always presses the primary movable sheave 53 onto the primary fixed sheave side, integration of the cylinder member 57 and the primary movable sheave 53 can be achieved to suppress the relative rotation between the cylinder member 57 and the primary movable sheave 53, and the durability and reliability of the belt type continuously variable transmission 1-4 are improved.

In the first and second embodiments, the supply-side valve 71 is arranged in the primary movable sheave 53, and the discharge-side control valve 72 is arranged in the primary partition 54. However, the invention is not limited to the first and second embodiments. For example, the supply-side valve 71 may be arranged in the primary partition 54, and the discharge-side control valve 72 may be arranged in the primary movable sheave 53. That is, the communication unit 70 may be provided in the positioning hydraulic chamber, i.e., in at least either the primary movable sheave 53 or primary partition 54 which constitute the primary hydraulic chamber 55. Both the supply-side valve 71 and the discharge-side control valve 72 may be arranged either the primary movable sheave 53 or the primary partition 54. That is, the communication unit 70 may be provided at least either the primary movable sheave 53 or the primary fixed sheave 52 to which the primary partition 54 is fixed.

The invention claimed is:

1. A belt type continuously variable transmission, comprising:
    two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;
    a belt which transmits the driving force, transmitted from the driving source to one pulley of the two pulleys, to the other pulley;
    a positioning hydraulic chamber which presses the movable sheave onto the fixed sheave side; and a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside, wherein a working oil passage is defined between the working oil supply shaft and the pulley shaft, the communication unit is provided in at least one of the movable sheave and the fixed sheave, and the supply-side passage is in fluid communication with the working oil passage through a communication hole disposed in the pulley shaft.

2. A belt type continuously variable transmission, comprising:

two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;

a belt which transmits the driving force, transmitted from the driving source to one pulley of the two pulleys, to the other pulley;

a positioning hydraulic chamber which presses the movable sheave onto the fixed sheave side; and a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside, wherein a working oil passage is defined between the working oil supply shaft and the pulley shaft, the supply-side passage is in fluid communication with the working oil passage through a communication hole disposed in the pulley shaft, and the communication unit includes:

a supply-side valve which permits the working oil only to be supplied from the outside to the positioning hydraulic chamber; and a discharge-side control valve which controls the permission or the prohibition of the discharge of the working oil from the positioning hydraulic chamber to the outside.

3. The belt type continuously variable transmission according to claim 2, wherein the discharge-side control valve prohibits the discharge of the working oil from the positioning hydraulic chamber to the outside when a position of the movable sheave is kept constant in the axial direction with respect to the fixed sheave.

4. The belt type continuously variable transmission according to claim 2, further comprising:

a centrifugal hydraulic chamber which faces the positioning hydraulic chamber in the axial direction, wherein the working oil discharged from the positioning hydraulic chamber to the outside is supplied to the centrifugal hydraulic chamber, when the discharge-side control valve permits the discharge of the working oil from the positioning hydraulic chamber to the outside.

5. The belt type continuously variable transmission according to claim 2, wherein the supply-side valve is a check valve which is opened toward a direction in which the working oil is supplied from the outside to the positioning hydraulic chamber, the supply-side valve is located in a radial inside of the movable sheave with respect to the discharge-side control valve, and the supply-side valve is arranged so as to be opened toward a radial outside of the movable sheave.

6. The belt type continuously variable transmission according to claim 2, wherein the supply-side valve is a check valve which is opened toward the direction in which the working oil is supplied from the outside to the positioning hydraulic chamber, and the supply-side valve is arranged so as to be opened toward the radial inside of the movable sheave.

7. The belt type continuously variable transmission according to claim 2, wherein the supply-side valve is a check valve which is opened toward the direction in which the working oil is supplied from the outside to the positioning hydraulic chamber, and the supply-side valve is arranged so as to be opened toward the fixed sheave side in the axial direction of the movable sheave.

8. A belt type continuously variable transmission, comprising:

two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;

a belt which transmits the driving force, transmitted from the driving source to one pulley of the two pulleys, to the other pulley;

a positioning hydraulic chamber which presses the movable sheave onto the fixed sheave side; and a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside, wherein a working oil passage is defined between the working oil supply shaft and the pulley shaft, the supply-side passage is in fluid communication with the working oil passage through a communication hole disposed in the pulley shaft, the positioning hydraulic chamber is a space unit which is formed by the movable sheave and a partition fixed to the fixed sheave, and the communication unit is provided at least one of the movable sheave and the partition constituting the space unit which is of the positioning hydraulic chamber.

9. The belt type continuously variable transmission according to claim 8, wherein a supply-side valve is arranged in the movable sheave, and a discharge-side control valve is arranged in the partition.

10. The belt type continuously variable transmission according to claim 9, wherein the supply-side valve is arranged on a side opposite to the fixed sheave beyond the space unit in the movable sheave.

11. A belt type continuously variable transmission, comprising:

two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;
a belt which transmits the driving force, transmitted from the driving source to one pulley of the two pulleys, to the other pulley;
a positioning hydraulic chamber which presses the movable sheave onto the fixed sheave side; and
a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside, wherein
a working oil passage is defined between the working oil supply shaft and the pulley shaft,
the supply-side passage is in fluid communication with the working oil passage through a communication hole disposed in the pulley shaft, and
the positioning hydraulic chamber presses the movable sheave to the fixed sheave in the pulley having the pulley shaft to which the driving force is transmitted from the driving source.

12. A belt type continuously variable transmission, comprising:
two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;
a belt which transmits the driving force, transmitted from the driving source to one pulley of the two pulleys, to the other pulley;
a positioning hydraulic chamber which presses the movable sheave onto the fixed sheave side;
a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside; and
a discharge-side passage which discharges the working oil from the positioning hydraulic chamber to the outside through the discharge-side control valve, wherein
a working oil passage is defined between the working oil supply shaft and the pulley shaft,
the supply-side passage is in fluid communication with the working oil passage through a communication hole disposed in the pulley shaft, and
the discharge-side passage is formed toward a substantially tangential direction of a direction in which the pulley shaft is rotated.

13. A belt type continuously variable transmission, comprising:
two pulleys which have two pulley shafts, two working oil supply shafts disposed inside of and coaxial with the two pulley shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;
a belt which transmits the driving force, transmitted from the driving source to one pulley of the two pulleys, to the other pulley;
a positioning hydraulic chamber which presses the movable sheave onto the fixed sheave side;
a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside; and
a discharge-side passage which discharges the working oil from the positioning hydraulic chamber to the outside through the discharge-side control valve, wherein
a working oil passage is defined between the working oil supply shaft and the pulley shaft,
the supply-side passage is in fluid communication with the working oil passage through a communication hole disposed in the pulley shaft, and
the discharge-side passage is formed toward a tangential direction of a direction in which the pulley shaft is rotated.

14. The belt type continuously variable transmission according to claim 12, wherein the discharge-side passage is directly communicated with the outside of the positioning hydraulic chamber.

15. A belt type continuously variable transmission, comprising:
two pulleys which have two pulley shafts, two working oil supply shafts disposed inside of and coaxial with the two pullet shafts, two movable sheaves, and two fixed sheaves, the two pulleys being arranged in parallel, a driving force being transmitted from a driving source to either of the two pulley shafts, the two movable sheaves sliding on the two pulley shafts in an axial direction respectively, the two fixed sheaves facing the two movable sheaves in the axial direction respectively;
a belt which transmits the driving force, transmitted from the driving source to one pulley of the two pulleys, to the other pulley;
a positioning hydraulic chamber which presses the movable sheave onto the fixed sheave side; and
a communication unit which is configured to permit working oil to be supplied from an outside of the positioning hydraulic chamber to the positioning hydraulic chamber through a supply-side passage and to control permission or prohibition of discharge of the working oil from the positioning hydraulic chamber to the outside, wherein
a working oil passage is defined between the working oil supply shaft and the pulley shaft,
the supply-side passage is in fluid communication with the working oil passage through a communication hole disposed in the pulley shaft,
one pulley of the two pulleys is a primary pulley which has a primary pulley shaft, a primary movable sheave, and a primary fixed sheave, a driving force being transmitted from a driving source to the primary pulley shaft, the primary movable sheave sliding on the primary pulley shaft in an axial direction of the primary pulley shaft, the primary fixed sheave facing the primary movable sheaves in the axial direction of the primary pulley shaft,
the other pulley is a secondary pulley which has a secondary pulley shaft, a secondary movable sheave, and a secondary fixed sheave, the secondary pulley shaft being arranged in parallel with the primary pulley, the secondary movable sheave sliding on the secondary pulley shaft in an axial direction of the secondary pulley shaft, the secondary fixed sheave facing the secondary movable sheave in the axial direction of the secondary pulley shaft, the belt transmits the driving force, transmitted from the driving source to the primary pulley, to the secondary pulley, and the positioning hydraulic chamber presses the primary movable sheave to the primary fixed sheave.

16. The belt type continuously variable transmission according to claim 15, wherein the communication unit includes:
a supply-side valve which permits the working oil only to be supplied from the outside to the positioning hydraulic chamber; and
a discharge-side control valve which controls the permission or the prohibition of the discharge of the working oil from the positioning hydraulic chamber to the outside.

17. The belt type continuously variable transmission according to claim 16, wherein the discharge-side control valve prohibits the discharge of the working oil from the positioning hydraulic chamber to the outside when a position of the primary movable sheave is kept constant in the axial direction with respect to the primary fixed sheave.

18. The belt type continuously variable transmission according to claim 16, further comprising:
a centrifugal hydraulic chamber which faces the positioning hydraulic chamber in the axial direction,
wherein the working oil discharged from the positioning hydraulic chamber to the outside is supplied to the centrifugal hydraulic chamber, when the discharge-side control valve permits the discharge of the working oil from the positioning hydraulic chamber to the outside.

19. The belt type continuously variable transmission according to claim 16, wherein
the supply-side valve is a check valve which is opened toward a direction in which the working oil is supplied from the outside to the positioning hydraulic chamber,
the supply-side valve is located in a radial inside of the primary movable sheave with respect to the discharge-side control valve, and
the supply-side valve is arranged so as to be opened toward a radial outside of the primary movable sheave.

20. The belt type continuously variable transmission according to claim 16, wherein
the supply-side valve is a check valve which is opened toward the direction in which the working oil is supplied from the outside to the positioning hydraulic chamber, and
the supply-side valve is arranged so as to be opened toward the radial inside of the primary movable sheave.

21. The belt type continuously variable transmission according to claim 16, wherein the supply-side valve is a check valve which is opened toward the direction in which the working oil is supplied from the outside to the positioning hydraulic chamber, and
the supply-side valve is arranged so as to be opened toward the primary fixed sheave in the axial direction of the primary movable sheave.

22. The belt type continuously variable transmission according to claim 15, wherein the communication unit is provided in at least one of the primary movable sheave and the primary fixed sheave.

23. The belt type continuously variable transmission according to claim 15, wherein
the positioning hydraulic chamber is a space unit which is formed by the primary movable sheave and a partition fixed to the primary fixed sheave, and
the communication unit is provided at least one of the primary movable sheave and the partition constituting the space unit which is of the positioning hydraulic chamber.

24. The belt type continuously variable transmission according to claim 23, wherein a supply-side valve is arranged in the primary movable sheave, and a discharge-side control valve is arranged in the partition.

25. The belt type continuously variable transmission according to claim 24, wherein the supply-side valve is arranged on a side opposite to the primary fixed sheave beyond the space unit in the primary movable sheave.

26. The belt type continuously variable transmission according to claim 15, wherein the positioning hydraulic chamber presses the primary movable sheave to the primary fixed sheave in the primary pulley having the primary pulley shaft to which the driving force is transmitted from the driving source.

27. The belt type continuously variable transmission according to claim 15, further comprising:
a discharge-side passage which discharges the working oil from the positioning hydraulic chamber to the outside through the discharge-side control valve,
wherein the discharge-side passage is formed toward a substantially tangential direction of a direction in which the primary pulley shaft is rotated.

28. The belt type continuously variable transmission according to claim 15, further comprising:
a discharge-side passage which discharges the working oil from the positioning hydraulic chamber to the outside through the discharge-side control valve,
wherein the discharge-side passage is formed toward a tangential direction of a direction in which the primary pulley shaft is rotated.

29. The belt type continuously variable transmission according to claim 27, wherein the discharge-side passage is directly communicated with the outside of the positioning hydraulic chamber.

* * * * *